United States Patent
Carrillo et al.

(10) Patent No.: US 11,455,348 B2
(45) Date of Patent: *Sep. 27, 2022

(54) SYSTEMS AND METHODS FOR SAVING AND PRESENTING A STATE OF A COMMUNICATION SESSION

(71) Applicant: eBay Inc., San Jose, CA (US)

(72) Inventors: Esmeralda Carrillo, Victorville, CA (US); Kristy Brambila, Oakland, CA (US); Cassandra Gordon, Sunland, CA (US); Enrica Montilla Beltran, Santa Cruz, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,756

(22) Filed: Feb. 17, 2020

(65) Prior Publication Data

US 2020/0183987 A1 Jun. 11, 2020

Related U.S. Application Data

(63) Continuation of application No. 15/655,522, filed on Jul. 20, 2017, now Pat. No. 10,606,905, which is a
(Continued)

(51) Int. Cl.
*G06F 16/95* (2019.01)
*G06F 16/958* (2019.01)

(52) U.S. Cl.
CPC ............ *G06F 16/95* (2019.01); *G06F 16/958* (2019.01)

(58) Field of Classification Search
CPC ............................... G06F 16/95; G06F 16/958
See application file for complete search history.

(56) References Cited

U.S. PATENT DOCUMENTS

| | | |
|---|---|---|
| 5,963,964 A | 10/1999 | Nielsen |
| 6,366,933 B1 | 4/2002 | Ball et al. |

(Continued)

FOREIGN PATENT DOCUMENTS

| | | |
|---|---|---|
| CN | 102270331 A | 12/2011 |
| CN | 102521317 A | 6/2012 |

(Continued)

OTHER PUBLICATIONS

Office Action received for Korean Patent Application No. 10-2016-7019698, dated Aug. 9, 2017, 11 pages (5 pages of English Translation and 6 pages of Official Copy).

(Continued)

*Primary Examiner* — Jennifer N Welch
*Assistant Examiner* — Kc Chen
(74) *Attorney, Agent, or Firm* — FIG. 1 Patents

(57) ABSTRACT

A system comprising a computer-readable storage medium storing at least one program, and a computer-implemented method for saving and presenting a state of a communication session are presented. The communication session may be established between a client device and an application server of a content publisher, and may include the presentation of content on the client device. In some embodiments, the method may include receiving user input to save a state of the communication session, and in response, temporarily storing session data representative of the state of the communication session for a predetermined duration of the communication session. The method may further include generating and presenting an interface that includes a visual representation of the session data, and allows a user to return to the saved state of the communication session.

20 Claims, 15 Drawing Sheets

Related U.S. Application Data continuation of application No. 14/137,085, filed on Dec. 20, 2013, now Pat. No. 9,740,777.

(56) References Cited

U.S. PATENT DOCUMENTS

| | | | |
|---|---|---|---|
| 6,533,594 B1 | 3/2003 | Kurup et al. | |
| 7,266,510 B1 | 9/2007 | Cofino et al. | |
| 7,614,004 B2 | 11/2009 | Milic-Frayling et al. | |
| 7,788,583 B1 | 8/2010 | Amzallag et al. | |
| 7,899,829 B1* | 3/2011 | Malla | G06F 16/9562 |
| | | | 707/741 |
| 8,166,406 B1 | 4/2012 | Goldfeder et al. | |
| 8,533,595 B2 | 9/2013 | Grossman et al. | |
| 8,600,784 B1 | 12/2013 | Ivey et al. | |
| 8,631,029 B1 | 1/2014 | Amacker | |
| 8,739,044 B1 | 5/2014 | Varadarajan | |
| 8,856,039 B1 | 10/2014 | Talreja et al. | |
| 9,092,405 B1 | 7/2015 | Hayden | |
| 9,549,028 B2 | 1/2017 | Sundaresan | |
| 9,589,541 B2 | 3/2017 | Gandhi | |
| 9,740,777 B2 | 8/2017 | Carrillo et al. | |
| 9,912,756 B2 | 3/2018 | Sundaresan | |
| 10,192,526 B2 | 1/2019 | Gandhi | |
| 10,504,491 B2 | 12/2019 | Gandhi | |
| 10,601,929 B2 | 3/2020 | Sundaresan | |
| 10,606,905 B2 | 3/2020 | Carrillo et al. | |
| 10,748,508 B2 | 8/2020 | Gandhi | |
| 10,771,567 B2 | 9/2020 | Sundaresan | |
| 11,030,978 B2 | 6/2021 | Gandhi | |
| 2003/0080986 A1 | 5/2003 | Baird | |
| 2003/0195963 A1 | 10/2003 | Song et al. | |
| 2004/0254844 A1* | 12/2004 | Torres | G06Q 30/02 |
| | | | 705/26.1 |
| 2005/0066037 A1 | 3/2005 | Song et al. | |
| 2005/0132296 A1 | 6/2005 | Milic-frayling et al. | |
| 2006/0031774 A1 | 2/2006 | Gaudette | |
| 2006/0224997 A1* | 10/2006 | Wong | G06F 16/9562 |
| | | | 715/838 |
| 2006/0248200 A1 | 11/2006 | Stanev | |
| 2007/0022385 A1 | 1/2007 | Denissov | |
| 2008/0040484 A1 | 2/2008 | Yardley | |
| 2008/0201650 A1* | 8/2008 | Lemay | H04M 1/2746 |
| | | | 715/763 |
| 2008/0288362 A1 | 11/2008 | King | |
| 2009/0024946 A1 | 1/2009 | Gotz | |
| 2009/0089267 A1 | 4/2009 | Chi et al. | |
| 2009/0132516 A1 | 5/2009 | Patel et al. | |
| 2009/0172582 A1 | 7/2009 | Miyawaki et al. | |
| 2009/0265255 A1 | 10/2009 | Jackson et al. | |
| 2010/0005097 A1 | 1/2010 | Liang et al. | |
| 2010/0048167 A1 | 2/2010 | Chow et al. | |
| 2010/0050068 A1 | 2/2010 | Usami | |
| 2010/0082637 A1 | 4/2010 | Mishne et al. | |
| 2010/0306171 A1 | 12/2010 | Antos et al. | |
| 2010/0325357 A1 | 12/2010 | Reddy et al. | |
| 2011/0213678 A1 | 9/2011 | Chorney | |
| 2011/0289459 A1 | 11/2011 | Athans et al. | |
| 2012/0066602 A1 | 3/2012 | Chai et al. | |
| 2012/0072821 A1 | 3/2012 | Bowling | |
| 2012/0081375 A1 | 4/2012 | Robert et al. | |
| 2012/0092277 A1 | 4/2012 | Momchilov | |
| 2012/0094644 A1 | 4/2012 | Hayashi et al. | |
| 2012/0159379 A1* | 6/2012 | Negrillo | G06F 3/04842 |
| | | | 715/781 |
| 2012/0185762 A1 | 7/2012 | Ozer et al. | |
| 2012/0216102 A1 | 8/2012 | Malla | |
| 2012/0216124 A1 | 8/2012 | Martino et al. | |
| 2012/0240050 A1 | 9/2012 | Goldfeder et al. | |
| 2012/0272192 A1 | 10/2012 | Grossman et al. | |
| 2013/0021369 A1 | 1/2013 | Denney et al. | |
| 2013/0050224 A1 | 2/2013 | Gehani et al. | |
| 2013/0076598 A1 | 3/2013 | Sirpal et al. | |
| 2013/0101101 A1 | 4/2013 | Waghmare et al. | |
| 2013/0222429 A1 | 8/2013 | Gandhi | |
| 2013/0231146 A1 | 9/2013 | Mathias et al. | |
| 2013/0232113 A1 | 9/2013 | Liang et al. | |
| 2013/0304590 A1 | 11/2013 | Motenko et al. | |
| 2014/0129455 A1 | 5/2014 | Davidson | |
| 2014/0289598 A1 | 9/2014 | Charitos | |
| 2014/0359735 A1 | 12/2014 | Lehmann et al. | |
| 2015/0007100 A1 | 1/2015 | Wang et al. | |
| 2015/0154686 A1 | 6/2015 | Lawrence et al. | |
| 2015/0177934 A1 | 6/2015 | Carrillo et al. | |
| 2015/0193851 A1 | 7/2015 | Hua et al. | |
| 2015/0237147 A1 | 8/2015 | Sundaresan | |
| 2016/0188146 A1* | 6/2016 | Tian | G06F 16/9562 |
| | | | 715/738 |
| 2017/0126813 A1 | 5/2017 | Sundaresan | |
| 2017/0178598 A1 | 6/2017 | Gandhi | |
| 2017/0316093 A1 | 11/2017 | Carrillo et al. | |
| 2018/0152520 A1 | 5/2018 | Sundaresan | |
| 2019/0130877 A1 | 5/2019 | Gandhi | |
| 2019/0320026 A1 | 10/2019 | Sundaresan | |
| 2020/0066235 A1 | 2/2020 | Gandhi | |
| 2020/0335066 A1 | 10/2020 | Gandhi | |
| 2020/0351356 A1 | 11/2020 | Sundaresan | |
| 2021/0256939 A1 | 8/2021 | Gandhi | |

FOREIGN PATENT DOCUMENTS

| | | |
|---|---|---|
| CN | 105874450 A | 8/2016 |
| CN | 106164822 A | 11/2016 |
| JP | 2002-109312 A | 4/2002 |
| JP | 2005-242760 A | 9/2005 |
| JP | 2006-243861 A | 9/2006 |
| JP | 2011-034295 A | 2/2011 |
| JP | 2011-159113 A | 8/2011 |
| JP | 2011-159281 A | 8/2011 |
| JP | 2012-146028 A | 8/2012 |
| JP | 2013-120603 A | 6/2013 |
| KR | 101913920 B1 | 10/2018 |
| WO | 2002/025466 A2 | 3/2002 |
| WO | 2007/116705 A1 | 10/2007 |
| WO | 2013/105128 A1 | 7/2013 |
| WO | 2015/095519 A1 | 6/2015 |
| WO | 2015/126835 A1 | 8/2015 |

OTHER PUBLICATIONS

Response to Office Action filed on Oct. 10, 2017, for Korean Patent Application No. 10-2016-7019698, dated Aug. 9, 2017, 30 pages (26 pages of Official Copy and 4 pages of English Claims).

Office Action received for Korean Patent Application No. 10-2016-7025298, dated Feb. 9, 2018, 11 pages (5 pages of English Translation and 6 pages of Official copy).

Office Action received for Korean Patent Application No. 10-2016-7025298, dated Jun. 8, 2018, 5 pages (2 pages of English Translation and 3 pages of Official Copy).

Response to Office Action filed on Apr. 9, 2018, for Korean Patent Application No. 10-2016-7025298, dated Feb. 9, 2018, 34 pages (26 pages of Official copy and 8 pages of English Claims).

Response to Office Action filed on Jul. 31, 2018, for Korean Patent Application No. 10-2016-7025298, dated Jun. 8, 2018, 13 pages (8 pages of Official Copy and 5 pages of English Claims).

Office Action received for Korean Patent Application No. 10-2018-7013182, dated Jun. 19, 2018, 4 pages (2 pages of English Translation and 2 pages of Official Copy).

Response to Office Action filed on Aug. 20, 2018, for Korean Patent Application No. 10-2018-7013182, dated Jun. 19, 2018, 15 pages (9 pages of Official Copy and 6 pages of English Translation of Claims).

Corrected Notice of Allowability received for U.S. Appl. No. 14/137,085, dated Jul. 20, 2017, 2 pages.

Final Office Action received for U.S. Appl. No. 14/137,085, dated Aug. 11, 2016, 21 pages.

Non-Final Office Action received for U.S. Appl. No. 14/137,085, dated Jan. 21, 2016, 19 pages.

Response to Final Office Action filed on Nov. 2, 2016 for U.S. Appl. No. 14/137,085 dated Aug. 11, 2016, 15 pages.

(56) References Cited

OTHER PUBLICATIONS

Response to Non-Final Office Action filed on Apr. 21, 2016 for U.S. Appl. No. 14/137,085 dated Jan. 21, 2016, 15 pages.
Corrected Notice of Allowability received for U.S. Appl. No. 14/183,106, dated Dec. 14, 2016, 6 pages.
Corrected Notice of Allowability received for U.S. Appl. No. 14/183,106, dated Oct. 6, 2016, 7 pages.
Corrected Notice of Allowability received for U.S. Appl. No. 14/183,106, dated Sep. 16, 2016, 7 pages.
Non-Final Office Action received for U.S. Appl. No. 14/183,106, dated Apr. 15, 2016, 17 pages.
Notice of Allowance received for U.S. Appl. No. 14/183,106, dated Aug. 31, 2016, 9 pages.
Response to Non-Final Office Action filed on Jul. 15, 2016 for U.S. Appl. No. 14/183,106 dated Apr. 15, 2016, 17 pages.
Extended European Search Report received for European Patent Application No. 14871877.8 dated Jan. 23, 2017, 13 pages.
Corrected Notice of Allowability received for U.S. Appl. No. 15/405,108, dated Dec. 29, 2017, 2 pages.
Notice of Allowance received for U.S. Appl. No. 15/405,108 dated Oct. 25, 2017, 12 pages.
Preliminary Amendment received for U.S. Appl. No. 15/405,108, filed Feb. 10, 2017, 8 pages.
Response to First Action Interview—Office Action Summary filed on Sep. 27, 2017 for U.S. Appl. No. 15/405,108 dated Jul. 18, 2017, 11 pages.
Response to First Action Interview-Pre-Interview Communication filed on Jun. 26, 2017, for U.S. Appl. No. 15/405,108, dated May 25, 2017, 2 pages.
Advisory Action received for U.S. Appl. No. 15/881,338, dated Jan. 10, 2019, 3 pages.
Corrected Notice of Allowability received for U.S. Appl. No. 15/881,338, dated Apr. 17, 2019, 2 pages.
Corrected Notice of Allowability received for U.S. Appl. No. 15/881,338, dated Nov. 15, 2019, 2 pages.
Corrected Notice of Allowability received for U.S. Appl. No. 15/881,338, dated Sep. 10, 2019, 2 Pages.
Corrected Notice of Allowability received for U.S. Appl. No. 15/881,338, dated Jun. 19, 2019, 2 pages.
Final Office Action received for U.S. Appl. No. 15/881,338, dated Nov. 2, 2018, 12 pages.
Notice of Allowance received for U.S. Appl. No. 15/881,338, dated Mar. 20, 2019, 7 pages.
Preliminary Amendment filed on Feb. 19, 2018 for U.S. Appl. No. 15/881,338, 9 Pages.
Response to Final Office Action filed on Dec. 27, 2018, for U.S. Appl. No. 15/881,338, dated Nov. 2, 2018, 11 pages.
Response to Non-Final Office Action filed on Sep. 26, 2018, for U.S. Appl. No. 15/881,338, dated Jun. 26, 2018, 13 pages.
Communication Pursuant to Article 94(3) EPC received for European Patent Application No. 15752010.7, dated Feb. 25, 2019, 9 pages.
Communication Pursuant to Article 94(3) EPC Received for European Patent Application No. 15752010.7, dated Sep. 27, 2019, Sep. 27, 2019, 9 pages.
Extended European Search Report received for European Patent Application No. 15752010.7, dated Nov. 15, 2017, 9 pages.
Response to Communication Pursuant to Article 94(3) EPC filed on Sep. 5, 2019 for European Patent Application No. 15752010.7, dated Feb. 25, 2019, 11 pages.
Response to Extended European Search Report filed on May 24, 2018 for European Patent Application No. 15752010.7, dated Nov. 15, 2017, 21 pages.
Office Action received for Canadian Patent Application No. 2,933,580, dated Apr. 10, 2017, 5 pages.
Response to Office Action filed on Oct. 3, 2017 for Canadian Patent Application No. 2,933,580, dated Apr. 10, 2017, 17 pages.
Office Action received for Canadian Patent Application No. 2,940,052, dated Feb. 13, 2018, 3 Pages.
Office Action received for Canadian Patent Application No. 2,940,052, dated Mar. 27, 2017, 4 pages.
Response to Office Action filed on Mar. 26, 2018, for Canadian Patent Application No. 2,940,052, dated Feb. 13, 2018, 13 pages.
Response to Office Action filed on Sep. 5, 2017 for Canadian Patent Application No. 2,940,052, dated Mar. 27, 2017, 24 pages.
First Examination Report Received for Australian Patent Application No. 2014364512 dated Nov. 30, 2016, 3 pages.
Response to First Examination Report Filed on Apr. 7, 2017 for Australian Patent Application No. 2014364512 dated Nov. 30, 2016, 22 pages.
Office Action received for Chinese Patent Application No. 201480069762.5, dated Feb. 19, 2019, 21 pages (8 pages of Official Copy and 13 pages of English Translation).
Office Action received for Chinese Patent Application No. 201480069762.5, dated Sep. 6, 2018, 23 pages (9 pages of Official Copy and 14 pages of English Translation).
Notice of Allowance received for Korean Patent Application No. 10-2018-7013182, dated Dec. 21, 2018, 3 pages (2 Pages of Official Copy and 1 Page of English Translation).
Notice of Allowance received for U.S. Appl. No. 14/137,085, dated Jan. 13, 2017, 20 pages.
First Action Interview—Pre-Interview Communication received for U.S. Appl. No. 15/405,108, dated May 25, 2017, 5 pages.
First Action Interview—Office Action Summary received for U.S. Appl. No. 15/405,108, dated Jul. 18, 2017, 5 pages.
First Action Interview Pre-Interview Communication received for U.S. Appl. No. 15/655,522, dated Jun. 24, 2019, 8 pages.
First Action Interview—Office Action Summary received for U.S. Appl. No. 15/655,522, dated Jul. 18, 2019, 9 pages.
Notice of Allowance received for U.S. Appl. No. 15/655,522, dated Nov. 25, 2019, 13 pages.
Response to First Action Interview—Office Action Summary filed on Aug. 16, 2019 for U.S. Appl. No. 15/655,522, dated Jul. 18, 2019, 16 pages.
Response to First Action Interview—Pre-Interview Communication filed on Jul. 9, 2019, for U.S. Appl. No. 15/655,522, dated Jun. 24, 2019, 7 pages.
Non-Final Office Action received for U.S. Appl. No. 15/881,338, dated Jun. 26, 2018, 11 pages.
Response to Communication Pursuant to Article 94(3) filed on Feb. 6, 2020, for European Patent Application No. 15752010.7, dated Sep. 27, 2019, 2 pages.
Decision of Rejection received for Chinese Patent Application No. 201480069762.5, dated Oct. 12, 2019, 18 pages (6 pages of official copy and 12 pages of English translation).
Notice of Decision to Grant Received received for Chinese Patent Application No. 201580017656.7, dated Jan. 2, 2020, 4 Pages (2 pages of official copy & 2 pages of English Translation).
Response to Office Action filed on Jan. 21, 2019, for Chinese Patent Application No. 201480069762.5, dated Sep. 6, 2018, 12 Pages (3 pages of English Translation and 9 pages of Official Copy).
Response to Office Action filed on May 6, 2019, for Chinese Patent Application No. 201480069762.5, dated Feb. 19, 2019, 13 Pages (3 pages of English Translation and 10 pages of Official Copy).
Response to Request for Reexamination filed on Jan. 13, 2020, for Chinese Patent Application No. 201480069762.5, dated Oct. 12, 2019, 14 Pages (4 pages of English Translations & 10 pages of Official Copy).
First Examination Report received for Australian Patent Application No. 2015219171 dated Jan. 25, 2017, 3 pages.
Response to First Examination Report dated Apr. 6, 2017 for Australian Patent Application No. 2015219171 dated Jan. 25, 2017, 21 pages.
Office Action received for Chinese Patent Application No. 201580017656.7, dated Jun. 5, 2018, 15 pages (7 Page of Official Copy and 8 Pages of English Translation).
Office Action received for Chinese Patent Application No. 201580017656.7, dated Aug. 2, 2019, 14 pages (7 pages of Official copy and 7 pages of English Translation).
Office Action received for Chinese Patent Application No. 201580017656.7, dated Jan. 14, 2019, 16 pages (10 pages of English Translation and 6 pages of Official Copy).

(56) References Cited

OTHER PUBLICATIONS

Response to Office Action filed on Mar. 29, 2019, for Chinese Patent Application No. 201580017656.7, dated Jan. 14, 2019, 12 Pages (5 pages of English Translation and 7 pages of Official Copy).
Response to Office Action filed on Oct. 15, 2019, for Canadian Patent Application No. 201580017656.7 dated Sep. 4, 2019, 14 Pages (11 pages of official copy & 3 pages of claims copy).
Response to Office Action filed on Oct. 18, 2018, for Chinese Patent Application No. 201580017656.7, dated Jun. 5, 2018, 17 pages (11 pages of Official Copy and 6 pages of English Claims).
Notice of Allowance received for Japanese Patent Application No. 2016-552640, dated Dec. 19, 2017, 6 pages (3 pages of English Translation and 3 pages of Official copy).
Office Action received for Japanese Patent Application No. 2016-552640, dated Aug. 1, 2017, 7 pages (4 Pages of Official Copy and 3 Pages of English Translation).
Response to Office Action filed on Oct. 27, 2017, for Japanese Patent Application No. 2016-552640, dated Aug. 1, 2017, 15 pages.
Notice of Rejection Grounds received for Japan Patent Application No. 2018-005338, dated Oct. 8, 2019, 6 pages (3 pages of official copy & 3 pages of English Translation).
Office Action received for Japan Patent Application No. 2018-005338, dated Feb. 5, 2019, 6 pages (3 pages of Official Copy and 3 pages of English Translation).
Response to Notice of Rejection Ground filed on Jan. 8, 2020, for Japan Patent Application No. 2018-005338, dated Oct. 8, 2019, 5 pages(4 pages of Official Copy & 1 page of English Translation of Claims).
Response to Office Action filed on Apr. 26, 2019 for Japanese Patent Application No. 2018-005338, dated Feb. 5, 2019, 7 pages. (3 pages of English Translation and 4 pages of Official copy).
Anonymous, "Save Session, Firefox Add-ons", Retrieved from the Internet: URL:http://web.archive.org/web/20111205042616/https://addons mozi11a.org/de/firefox/addon/save-session, Jul. 21, 2009, 2 pages.
International Preliminary Report on Patentability received for PCT Application No. PCT/US2014/071155, dated Jun. 30, 2016, 8 pages.
International Search Report received for PCT Patent Application No. PCT/US2014/071155, dated Mar. 31, 2015, 2 pages.
International Written Opinion received for PCT Patent Application No. PCT/US2014/071155, dated Mar. 31, 2015, 6 pages.
International Preliminary Report on Patentability received for PCT Application No. PCT/US2015/016181, dated Sep. 1, 2016, 9 pages.
International Search Report received for PCT Patent Application No. PCT/US2015/016181, dated May 21, 2015, 2 pages.
International Written Opinion received for PCT Patent Application No. PCT/US2015/016181, dated May 21, 2015, 7 pages.
Sandaram, "How-To: Save and Restore Your Browsing History in Firefox", Retrieved from the Internet URL: <http://echawakening_org/how-to-save-history-in-firefox/915/, May 9, 2018, 5 pages.
Applicant Initiated Interview Summary received for U.S. Appl. No. 13/407,417, dated Jan. 13, 2016, 3 pages.
Applicant Initiated Interview Summary received for U.S. Appl. No. 13/407,417, dated Jul. 22, 2015, 3 pages.
Applicant Initiated Interview Summary received for U.S. Appl. No. 13/407,417, dated Nov. 19, 2014, 3 pages.
Applicant Initiated Interview Summary received for U.S. Appl. No. 13/407,417, dated Sep. 1, 2016, 3 pages.
Final Office Action received for U.S. Appl. No. 13/407,417, dated Apr. 10, 2015, 18 pages.
Final Office Action received for U.S. Appl. No. 13/407,417, dated Jun. 28, 2016, 19 pages.
Final Office Action received for U.S. Appl. No. 13/407,417, dated May 7, 2014, 15 pages.
Non-Final Office Action received for U.S. Appl. No. 13/407,417, dated Nov. 3, 2015, 16 pages.
Non-Final Office Action received for U.S. Appl. No. 13/407,417, dated Sep. 12, 2013, 11 pages.
Non-Final Office Action received for U.S. Appl. No. 13/407,417, dated Sep. 18, 2014, 18 pages.
Notice of Allowance received for U.S. Appl. No. 13/407,417, dated Oct. 25, 2016, 8 pages.
Response to Final Office Action filed on Aug. 10, 2015 for U.S. Appl. No. 13/407,417, dated Apr. 10, 2015, 13 pages.
Response to Final Office Action filed on Jun. 28, 2014 for U.S. Appl. No. 13/407,417, dated May 7, 2014, 10 pages.
Response to Final Office Action filed on Sep. 28, 2016 for U.S. Appl. No. 13/407,417, dated Jun. 28, 2016, 11 pages.
Response to Non-Final Office Action filed on Dec. 12, 2013 for U.S. Appl. No. 13/407,417, dated Sep. 12, 2013, 11 pages.
Response to Non-Final Office Action filed on Dec. 18, 2014 for U.S. Appl. No. 13/407,417, dated Sep. 18, 2014, 13 pages.
Response to Non-Final Office Action filed on Feb. 3, 2016 for U.S. Appl. No. 13/407,417, dated Nov. 3, 2015, 14 pages.
Applicant Initiated Interview Summary Received for U.S. Appl. No. 15/446,532 dated May 1, 2018, 3 pages.
Non-Final Office Action received for U.S. Appl. No. 15/446,532, dated Jul. 17, 2017, 17 pages.
Non-Final Office Action received for U.S. Appl. No. 15/446,532, dated Mar. 30, 2017, 5 pages.
Non-Final Office Action Received for U.S. Appl. No. 15/446,532 dated Apr. 10, 2018, 18 pages.
Notice of allowance received for U.S. Appl. No. 15/446,532, dated Sep. 13, 2018, 6 pages.
Preliminary Amendment filed for U.S. Appl. No. 15/446,532, filed Mar. 27, 2017, 8 pages.
Response to Non-Final Office Action filed on Jul. 3, 2018, for U.S. Appl. No. 15/446,532, dated Apr. 10, 2018, 17 pages.
Response to Non-Final Office Action filed on Dec. 27, 2017, for U.S. Appl. No. 15/446,532, dated Jul. 14, 2017, 14 Pages.
Response to Non-Final Office Action filed on Jun. 26, 2017 for U.S. Appl. No. 15/446,532, dated Mar. 30, 2017, 8 pages.
Communication Pursuant to Article 94(3)EPC Received for European Patent Application No. 15752010.7, dated May 12, 2020, 11 pages.
Non-Final Office Action received for U.S. Appl. No. 16/232,918, dated May 23, 2019, 14 pages.
Notice Of Allowance received for U.S. Appl. No. 16/232,918, dated Sep. 17, 2019, 8 pages.
Response to Non-Final Office Action Filed on Aug. 26, 2019, for U.S. Appl. No. 16/232,918 dated May 23, 2019, 8 pages.
Amendment Under 37 CFR filed on May 11, 2020 U.S. Appl. No. 16/453,711, 7 pages.
Corrected Notice of Allowability Received for U.S. Appl. No. 16/453,711, dated Jun. 26, 2020, 2 pages.
Corrected Notice of Allowability received for U.S. Appl. No. 16/453,711, dated Jun. 4, 2020, 2 pages.
Notice of Allowance received for U.S. Appl. No. 16/453,711, dated May 1, 2020, 8 pages.
Response to Rule 312 Communication Received for U.S. Appl. No. 16/453,711, dated May 21, 2020, 2 pages.
Applicant Interview summary received for U.S. Appl. No. 16/670,820, dated Feb. 13, 2020, 3 pages.
Non Final Office Action Received for U.S. Appl. No. 16/670,820, dated Nov. 27, 2019,16 pages.
Notice Of Allowance received for U.S. Appl. No. 16/670,820, dated Jun. 25, 2020, 8 pages.
Notice Of Allowance received for U.S. Appl. No. 16/670,820, dated Mar. 18, 2020, 9 Pages.
Response to Non-Final Office Action filed on Feb. 24, 2020 for U.S. Appl. No. 16/670,820, dated Nov. 27, 2019, 15 Pages.
Zhang et al., "Enhancing Dynamic-Viewport Mobile Applications with Screen Scrolling", Journal of Latex Class Files, vol. 14, Aug. 8, 2015, pp. 1-15.
Non-Final Office Action received for U.S. Appl. No. 16/921,559, dated Dec. 16, 2020, 19 Pages.
Re-Examination Notification Received for Chinese Patent Application No. 201480069762.5, dated Apr. 29, 2021, 14 Pages (1 Page of English translation and 13 Pages of Official Copy).

(56) References Cited

OTHER PUBLICATIONS

Decision of Reexamination Received for Chinese Patent Application No. 201480069762.5, dated Jul. 29, 2021, 19 Pages (Official Copy Only).
Notice of Allowance received for Japanese Patent Application No. 2020-109624, dated Jun. 15, 2021, 6 Pages(3 pages of Official Copy & 3 Pages of English Translation).
Notice of Allowance Received for U.S. Appl. No. 16/921,559, dated Mar. 10, 2021, 8 Pages.
Non Final Office Action Received for U.S. Appl. No. 16/929,605, dated Mar. 8, 2021, 11 pages.
Extended European Search Report Received for European Patent Application No. 21156338.2, dated Apr. 20, 2021, 16 Pages.
21156338.2 , "Communication under Rule 71(3) received for European Patent Application No. 21156338.2, dated Feb. 17, 2022", Feb. 17, 2022, 116 pages.

\* cited by examiner

SYSTEMS AND METHODS FOR SAVING AND PRESENTING A STATE OF A COMMUNICATION SESSION

PRIORITY

This application is a continuation of and claims priority to U.S. patent application Ser. No. 15/655,522, filed Jul. 20, 2017, entitled, "Systems and Methods for Saving and Presenting a State of a Communication Session", which claims priority to U.S. Pat. No. 9,740,777, filed Dec. 20, 2013, entitled, "Systems and Methods for Saving and Presenting a State of a Communication Session", the disclosures of which are incorporated by reference herein.

TECHNICAL FIELD

This application relates to data processing. In particular, example embodiments may relate to systems and methods for saving a state of a communication session.

BACKGROUND

Traditionally, users browsing online content may employ multiple screen, browser windows or tabs. For example, users may use multiple tabs in a browser window to compare multiple similar products. Users who may wish to browse content online using a mobile device may be unable to employ such a comparison strategy due to the limited screen space of mobile devices.

Further, while browsing through content online, users may wish to return to a previous state of their browsing experience (e.g., a previous search query). Current bookmarking technology provided by internet browsers allow users to "bookmark" (e.g., save) certain web pages. However, such bookmarking services are limited only to web pages and are often unable to save the state of certain pages (e.g., checkout pages, filled out forms, etc.) with elements that may be time sensitive. Thus, in order to return to the desired previous state, users must recall and completely recreate the steps (e.g., keyword searches performed, items clicked, pages viewed or the like) that lead to the desired state.

BRIEF DESCRIPTION OF THE DRAWINGS

Various ones of the appended drawings merely illustrate example embodiments of the present invention and cannot be considered as limiting its scope.

DETAILED DESCRIPTION

Reference will now be made in detail to specific example embodiments for carrying out the inventive subject matter. Examples of these specific embodiments are illustrated in the accompanying drawings. It will be understood that they are not intended to limit the scope of the claims to the described embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details. In accordance with the present disclosure, components, process steps, and data structures may be implemented using various types of operating systems, programming languages, computing platforms, computer programs, and/or general purpose machines.

Aspects of the present disclosure describe systems and methods for saving and presenting a state of a communication session. The communication session may be established between a client device and an application server of a content publisher, and may include the presentation of content on the client device. For example, a communication session may include searching, viewing, comparing, and purchasing items offered for sale in an online marketplace. In some embodiments, the method may include receiving user input to save a state of the communication session. The state of the communication session may represent the entire context leading to and forming the condition of a communication session at a particular time. The state of the communication session may include a series of actions performed by a user while being engaged in online activity (e.g., viewing a webpage, exchanging data with an application server, etc.). In response to receiving the user input, session data representative of the state of the communication session may be stored for a predetermined duration, consistent with some embodiments. The method may further include generating an interface that includes a visual representation of the session data, and allows a user to navigate back to the saved state of the communication session. In this manner, a user may be able to recall a state of the communication session without having to recreate the flow (e.g., the series of actions leading to the saved state) of the communication session. Further, the interface may allow a user to quickly compare multiple items in one interface. The method may further include providing instructions to the client device that cause the client device to present the interface.

Figure 1:
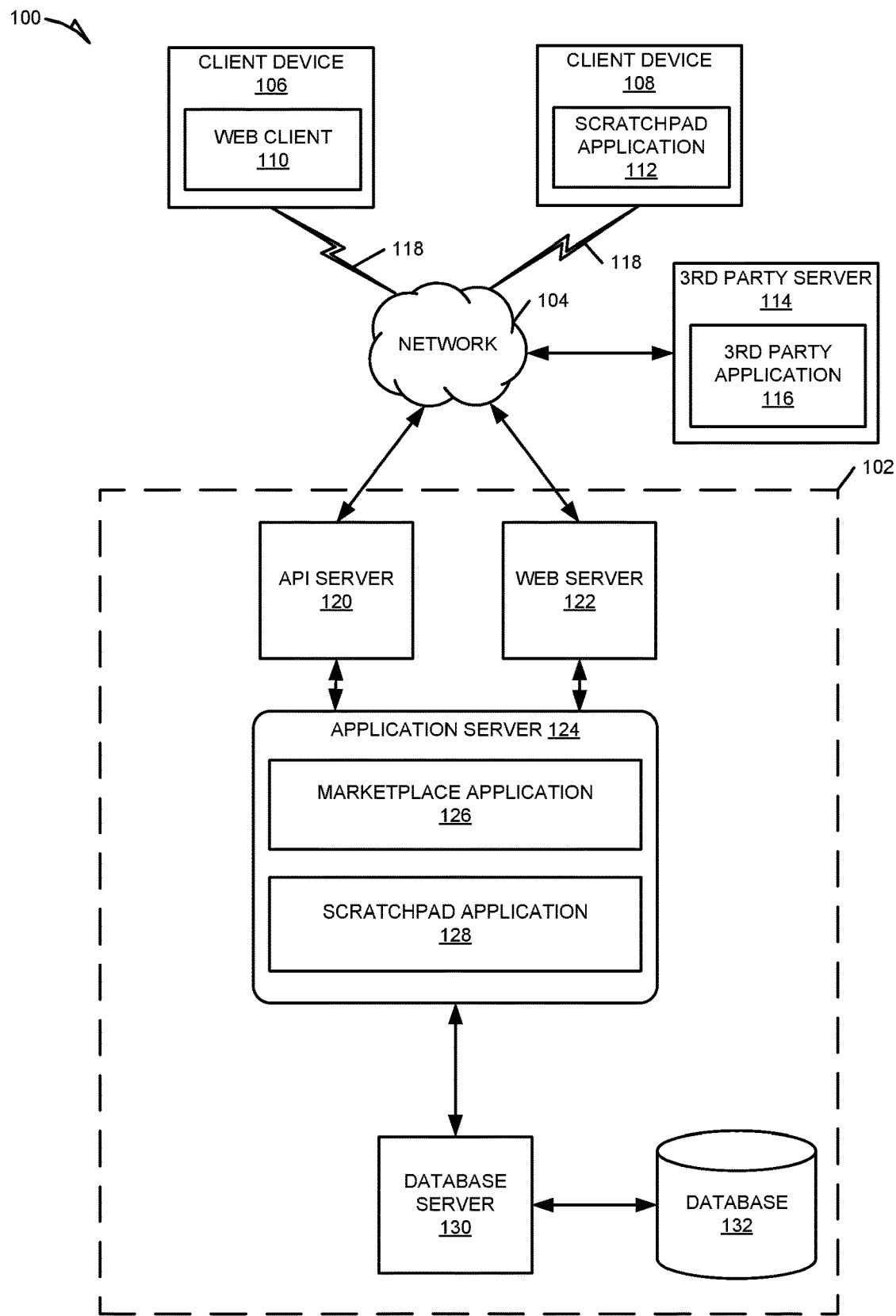
FIG. 1 is a network diagram depicting a network system having a client-server architecture configured for exchanging data over a network, according to an example embodiment.

FIG. 1 is a network diagram depicting a network system 100, according to one embodiment, having a client-server architecture configured for exchanging data over a network. The network system 100 may include a network-based content publisher 102 in communication with client devices 106 and 108, and third party server 114. For example, the network-based content publisher 102 may be a network-based marketplace.

The network-based content publisher 102 may communicate and exchange data within the network system 100 that may pertain to various functions and aspects associated with the network system 100 and its users. The network-based content publisher 102 may provide server-side functionality, via a network 104 (e.g., the Internet), to one or more client devices (e.g., client devices 106 and 108). The one or more client devices may be operated by users that use the network system 100 to exchange data over a communication network 104. These transactions may include transmitting, receiving (communicating), and processing data to, from, and regarding content and users of the network system 100. The data may include, but are not limited to: images; video or audio content; user preferences; product and service feedback, advice, and reviews; product, service, manufacturer, and vendor recommendations and identifiers; product and service listings associated with buyers and sellers; product and service advertisements; auction bids; and transaction data, among other things.

In various embodiments, the data exchanged within the network system 100 may be dependent upon user-selected functions available through one or more client or user interfaces (UIs). The UIs may be associated with a client device, such as a client device 106 using web client 110. The web client 110 may be in communication with the network-based content publisher 102 via a web server 122. The UIs may also be associated with a client device 108 using scratchpad application 112, such as a client application in communication with the network-based content publisher 102, or a third party server 114 (e.g., one or more servers or client devices) hosting a third party application 116.

The client devices 106 and 108 may be any of a variety of types of devices. For example, the client devices 106 and 108 may a mobile device such as a smartphone such as an iPhone® or other mobile device running the iOS® operating system, the Android operating system, a BlackBerry® operating system, the Microsoft® Windows® Phone operating system, Symbian® OS, or webOS®. Consistent with some embodiments, the client devices 106 and 108 may alternatively be a tablet computer, such as an iPad or other tablet computer running one of the aforementioned operating systems. In some embodiments, the client device 106 and 108 may also be a personal digital assistant (PDA), a personal navigation device (PND), a handheld computer, a desktop computer, a laptop or netbook, a set-top box (STB) such as provided by cable or satellite content providers, a wearable computing device such as glasses or a wristwatch, a multimedia device embedded in an automobile, a Global Positioning System (GPS) device, a data enabled book reader, or a video game system console such as the Nintendo Wii the Microsoft Xbox 360®, or the Sony PlayStation 3®, or other video game system consoles.

The client devices 106 and 108 may interface via a connection 118 with the communication network 104 (e.g., the Internet or Wide Area Network (WAN)). Depending on the form of the client device 106 and 108, any of a variety of types of connections 118 and communication networks 104 may be used. For example, the connection 118 may be Code Division Multiple Access (CDMA) connection, a Global System for Mobile communications (GSM) connection, or other type of cellular connection. Such a connection 118 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the communication network 104 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or to other types of networks).

In another example, the connection 118 may be Wireless Fidelity (Wi-Fi, IEEE 802.11x type) connection, a Worldwide Interoperability for Microwave Access (WiMAX) connection, or another type of wireless data connection. In such an embodiment, the communication network 104 may include one or more wireless access points coupled to a local area network (LAN), a WAN, the Internet, or other packet-switched data network. In yet another example, the connection 118 may be a wired connection, for example an Ethernet link, and the communication network 104 may be a LAN, a WAN, the Internet, or other packet-switched data network. Accordingly, a variety of different configurations are expressly contemplated.

FIG. 1 also illustrates a third party application 116 executing on the third party server 114 that may offer one or more services to users of the client devices 106 and 108. The third party application 116 may have programmatic access to the network-based content publisher 102 via the programmatic interface provided by an application program interface (API) server 120. In some embodiments, the third party application 116 may be associated with any organizations that may conduct transactions with or provide services to the users of the client devices 106 and 108.

Turning specifically to the network-based content publisher 102, the API server 120 and a web server 122 are coupled to, and provide programmatic and web interfaces respectively to, one or more application servers 124. The application server 124 may, for example, host one or more marketplace applications 126, which may provide a number of marketplace functions and services to users that access the network-based content publisher 102. The application server 124 may also host one or more scratchpad applications 128, which may be configured to store and generate scratchpad interfaces with session data representative of a state of a communication session. Such scratchpad interface may, for example, be presented on one of the client devices 106 or 108.

The application server 124 may be coupled via the API server 120 and the web server 122 to the communication network 104, for example, via wired or wireless interfaces. The application server 124 is, in turn, shown to be coupled to one or more database servers 130 that facilitate access to a database 132. In some examples, the application server 124 can access the database 132 directly without the need for a database server 130. In some embodiments, the database 132 may include multiple databases that may be both internal and external to the network-based content publisher 102.

While the marketplace application 126 and the scratchpad application 128 are shown in FIG. 1 to both form part of the network-based content publisher 102, it will be appreciated that, in alternative embodiments, the scratchpad application 128 may form part of a service that is separate and distinct from the network-based content publisher 102. Further, while the system 100 shown in FIG. 1 employs client-server architecture, the present inventive subject matter is, of course, not limited to such an architecture, and could equally well find application in an event-driven, distributed, or peer-to-peer architecture system, for example. The various modules of the application server 124 may also be implemented as standalone systems or software programs, which do not necessarily have networking capabilities.

Figure 2:
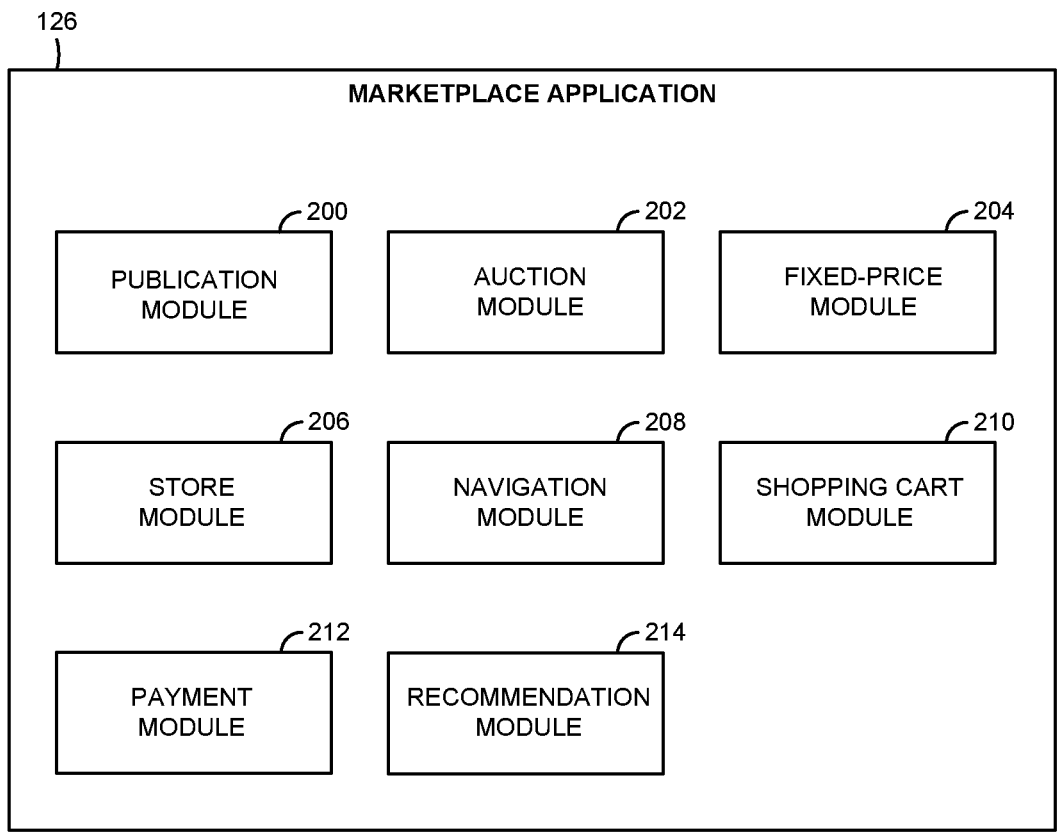
FIG. 2 is a block diagram illustrating an example embodiment of multiple modules forming a marketplace application, which is provided as part of the network system of FIG. 1.

FIG. 2 is a block diagram illustrating an example embodiment of multiple modules forming a marketplace application 126, which is provided as part of the network system of FIG. 1. The modules of the marketplace application 126 may be hosted on dedicated or shared server machines that are communicatively coupled to enable communications between server machines. Each of the modules 200-214 are communicatively coupled (e.g., via appropriate interfaces) to each other and to various data sources, so as to allow information to be passed between the modules 200-214 of the marketplace application 126 or so as to allow the modules 200-214 to share and access common data. The various modules of the marketplace application 126 may furthermore access one or more databases 132 via the database server 130 (FIG. 1).

The marketplace application 126 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace application 126 is shown to include at least one publication module 200 and at least one auction module 202, which support auction-format listing and price setting mechanisms (e.g., English, Dutch, Vickrey, Chinese, Double, Reverse auctions etc.). The auction module 202 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price modules 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

A store module 206 may allow sellers to group their product listings (e.g., goods and/or services) within a "virtual" store, which may be branded and otherwise personalized by and for the sellers. Such a virtual store may also offer promotions, incentives, and features that are specific and personalized to a relevant seller. In one embodiment, the listings and/or transactions associated with the virtual store and its features may be provided to one or more users.

Navigation of the network-based content publisher 102 may be facilitated by one or more navigation modules 208. For example, a search module may, inter alia, enable key word searches of listings published via the network-based content publisher 102. A browser module may allow users via an associated UI to browse various category, catalogue, inventory, social network, and review data structures within the network-based content publisher 102. Various other navigation modules 208 (e.g., an external search engine) may be provided to supplement the search and browsing modules. Consistent with some embodiments, the results for key word searches of listings published via the network-based content publisher 102 may be filtered to include only listings corresponding to social network connections of the user (e.g., indicated friends and family).

In one embodiment, an electronic shopping cart module 210 is used to create an electronic shopping cart used by users of the network-based content publisher 102 to add and store products (e.g., goods and services) listed by the store module 206. The electronic shopping cart module 210 may also be used to "check out," meaning a user may purchase products in the electronic shopping cart. The electronic shopping cart module 210 may facilitate the transactions by automatically finding the products in the electronic shopping cart across at least one or all of a predefined set of vendors, a comparison shopping site, an auction site, etc. In various embodiments, the selection criteria for which vendor or vendors to purchase from may include, but are not limited to, criteria such as lowest cost, fastest shipping time, preferred or highest rated vendors or sellers, or any combination thereof.

As illustrated in FIG. 2, the marketplace application 126 may include at least one payment module 212 that may provide a number of payment services and functions to users. The payment module 212 may allow users to accumulate value (e.g., in a commercial currency, such as the U.S. dollar, or a proprietary currency, such as "points") in accounts, and then later to redeem the accumulated value for products (e.g., goods or services) that are made available via the payment module 212. For some example embodiments, the payment module 212 generally enable transfer of values (e.g., funds, reward points, etc.) from an account associated with one party (e.g., a sender) to another account associated with another party (e.g., a receiver).

As illustrated in FIG. 2, the marketplace application 126 may include at least one recommendation module 214, which may provide recommendation services and functions to users. In some embodiments, the recommendation module 214 may receive requests for recommendations, and, in turn, provide a recommendation to the user based on information contained in the user's corresponding user profile. In some embodiments, the recommendation module 214 may automatically generate and provide a recommendation based on the activity of the user. The recommendations provided by the recommendation module 214 may contain one or more items (e.g., products offered for sale, articles, blogs, movies, social network connections, etc.) that may potentially interest a user. The recommendations may, for example, be based on previous products purchased by the user or a social network connection of the user, a web page viewed by the user, or an item given favorable feedback by the user or a social connection of the user.

Figure 3:
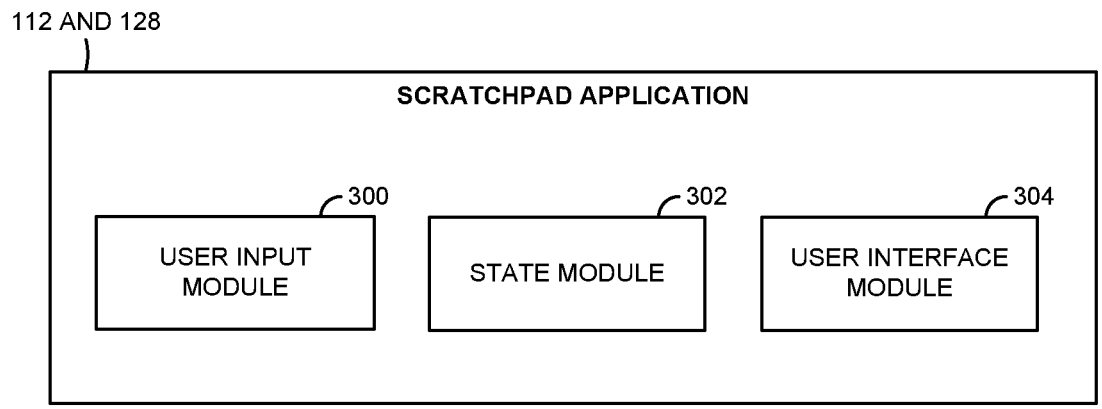
FIG. 3 is a block diagram illustrating an example embodiment of multiple modules forming a scratchpad application, which is provided as part of the network system of FIG. 1.

FIG. 3 is a block diagram illustrating an example embodiment of multiple modules forming scratchpad applications 112 and 128, which are provided as part of the network-based content publisher 102. The scratchpad applications 112 and 128 are shown as including at least one user input module 300, state module 302, and user interface module 304, all configured to communicate with each other (e.g., via a bus, shared memory, a switch, or application programming interfaces (APIs)). The various modules of the scratchpad applications 112 and 128 may access one or more databases 132 via the database server 130, and each of the various modules of the scratchpad applications 112 and 128 may each be in communication with one or more third party applications 116. Further, the various modules of the scratchpad applications 112 and 128 may access a machine-readable memory of the client devices 106 and 108.

Consistent with some embodiments, the user input module 300 may be configured to receive user input generated by one or more input/output (I/O) devices that may be included with or communicatively coupled to one of the client devices 106 or 108. Depending on the form of the client devices, the I/O devices may, for example, be a mouse, a track pad, a keypad, a keyboard, a multi-touch sensing surface (e.g., a touchscreen or trackpad), a microphone, a speaker, a camera, and the like. The user input may be received by one of the aforementioned I/O devices and in some embodiments, transmitted to the application server 124 for receipt by the user input module 300.

The state module 302 may be configured to capture and store session data that is representative of a state of a communication session and may be used to recall the state of the communication session. Session data refers to a series of steps, events or actions performed by a user when visiting a web site or performing another activity while using an application executing on a client device. Example session data includes events that describe the actions performed by a user when conducting an online transaction, completing an online form, taking an online survey, and participating in other online activities that involve two or more steps performed by the user. The session data may include information provided by a user, buttons (or other visual indicators) activated by the user, an identification of steps completed by the user, keystrokes, and cursor and pointer movements, actions canceled by the user, and so forth.

Consistent with some embodiments, the session data may include clickstream data. Accordingly, the state module 302 may be configured to monitor, track, and record the activities and interactions of a user, using one or more devices (e.g., client device 106), with the various module of the network system 100. The session data may be captured by the state module 302 and stored in response to the receipt of user input (e.g., received by the user input module 300) to signal the saving of the state of the communication session. The session data may be stored by the state module 302 as an XML-based text document, consistent with some embodiments. In some embodiments, the session data may be stored by the state module 302 in the database 132. In some embodiments, the session data may be stored by the state module 302 in a machine-readable medium of a client device of the user (e.g., client device 106 or 108).

The session data may further include interactions of a client device with the application server 124. Accordingly, the session data may include requests made by a user and transmitted by the user's client device to the application server 124. Consistent with some embodiments, the requests may, for example, include keyword search queries performed, requests for recommendations, web page view requests, requests to add a product to a user wish list, watch list or electronic shopping cart, or the like. In some embodiments, the session data may also include responses to the user requests received from the application server 124. The responses may, for example, include keyword search results, recommendations, web pages, interfaces for a wish list, watch list or electronic shopping cart, or the like. It will be appreciated that in some embodiments, the keyword searches, recommendations and web pages may correspond to one or more listings created and maintained by the marketplace application 126. The session data may further include contextual information provided by an application executing on a client device as part of the communication session.

The user interface module 304 may be configured to generate scratchpad interfaces to be presented on a client device of a user. Upon generating the one or more scratchpad interfaces, the user interface module 304 may transmit instructions to the client device that cause the client device to display the user interfaces. Consistent with some embodiments, the user interface module 304 may generate a scratchpad interface to allow a user to quickly save, access, and compare items of interest to the user. The scratchpad interface may be displayed by a client device of the user in conjunction with one or more other scratchpad interfaces involved in a given communication session with the client device. The scratchpad interface may include a display of the session data captured by the state module 302 that is representative of the state of a communication session. A scratchpad interface may include multiple sets of session data. Depending on the user's activity during a given data session, the multiple sets of session data may include both homogeneous and heterogeneous groups. For example, a homogeneous group of session data sets may include data related to a particular category of products (e.g., "digital cameras"), while a heterogeneous group of session data may include data related to products from various categories of products (e.g., a digital camera, a holiday sweater, and a toaster).

In some embodiments, the scratchpad interface may include functionality to allow a user to compare multiple items included in multiple sets of session data. In some embodiments, this functionality may be provided to users upon receiving user input (e.g., received by the user input module 300) requesting a comparison of a homogeneous group of session data sets. The comparison may include a comparison of various attributes of items included in session data. For example, the scratchpad interface may contain a homogeneous group of three sets of session data. The first set of session data may relate to a first digital camera, the second set of session data may relate to a second digital camera, and the third set of session data may relate to a third digital camera. Following this example, the state module 302 may, upon receiving appropriate user input, generate a display of the three sets of session data in a manner for convenient comparison of the three digital cameras including a comparison of a select set of attributes of each.

Figure 4A:
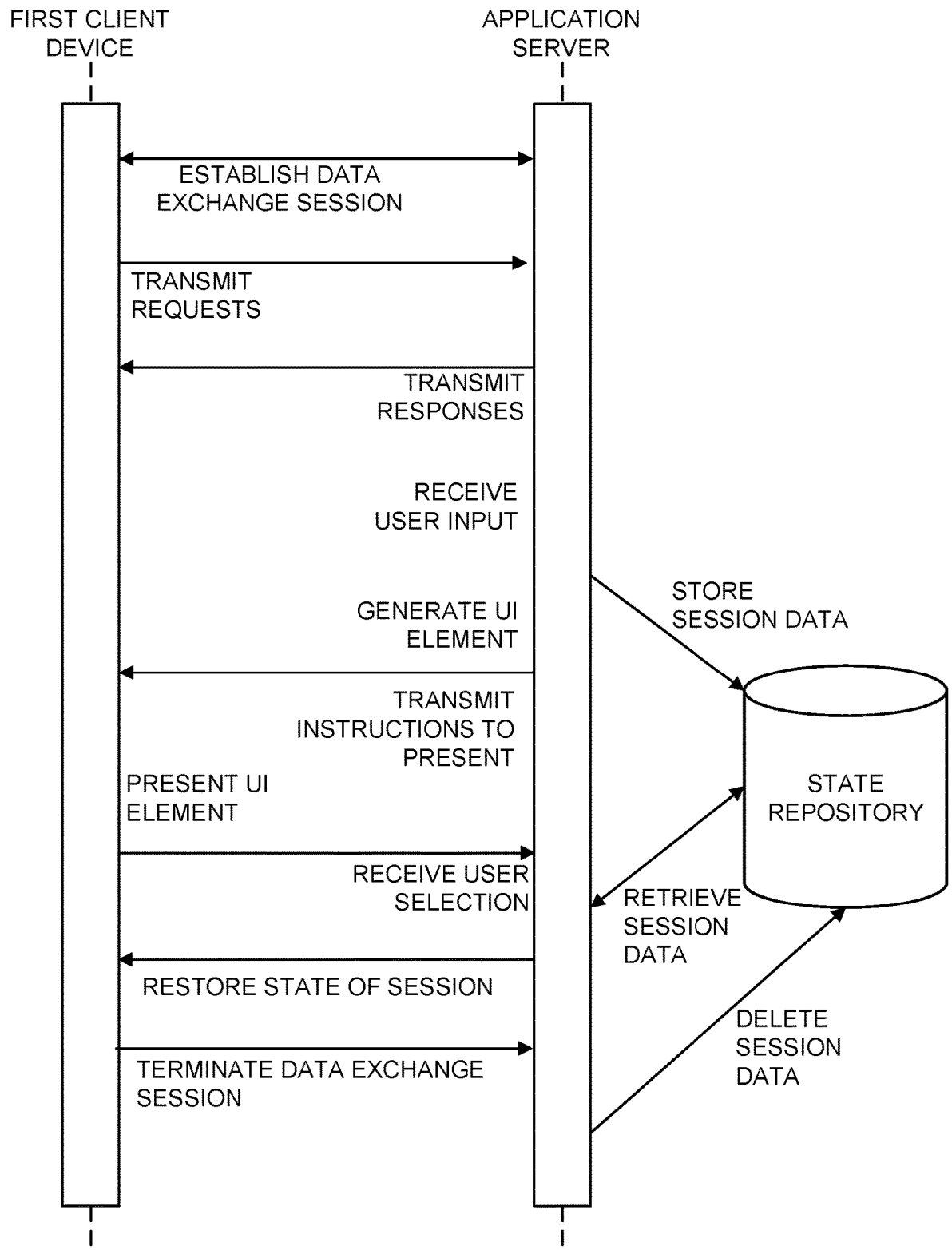
FIG. 4A is an interaction diagram depicting a communication session between a first client device, and an application server, consistent with some embodiments.

FIG. 4A is an interaction diagram depicting a communication session between a first client device and an application server, consistent with some embodiments. The first client device illustrated in FIG. 4A is the first client device of at least two client devices belonging to a user and may, for example, correspond to the client device 106 or 108. The application server may, for example, correspond to the application server 124.

As shown, a communication session may be established between the first client device and the application server. In some embodiments, the user may be instructed to log in or otherwise authenticate his identity as part of establishing the communication session. The communication session may comprise multiple data exchanges over a network (e.g., communication network 104) including the transmission of a plurality of requests by the first client device received by the application server. The application server may, in turn, transmit a plurality of responses to the first client device in response to the aforementioned plurality of requests. During the course of the communication session with the first client device, the user may identify an item of interest that the user would like to revisit at a later time. Accordingly, the user, utilizing one of several possible I/O devices of the first client device, may signal the application server, through appropriate user input, to save the state of the communication session.

In response to receiving the user input, the application server may store session data representative of the state of the data session in a session data repository (e.g., database 132). Further, the application server may generate a scratchpad interface that includes a visual representation of the session data. The application server may then transmit instructions to the first client device that causes the client device to display the scratchpad interface.

The first client device may present the scratchpad interface in conjunction with other content involved in the continued execution of the communication session. In addition to providing a visual representation of the session data, the scratchpad interface presented on the first client device may allow the user to return to a particular state of the communication session through selection of the visual representation of the session data. As shown, the application server may receive the user selection of the session data.

In response to receiving the user selection, the application server may retrieve the session data from the session data repository. The application server may then provide instructions to the first client device that cause the first client device to recall and return to the state of the communication session previously captured in response to the user input. In this manner, the user may revisit the state of the communication session during which the user identified the item of interest.

As illustrated in FIG. 4A, the communication session between the first client device and the application server may subsequently be terminated. Consistent with some embodiments, in response to terminating the communication session, the application server may remove or delete the session data stored in the data session repository, at which point the session data may no longer be available for display in the scratchpad interface during subsequent communication sessions.

Figure 4B:
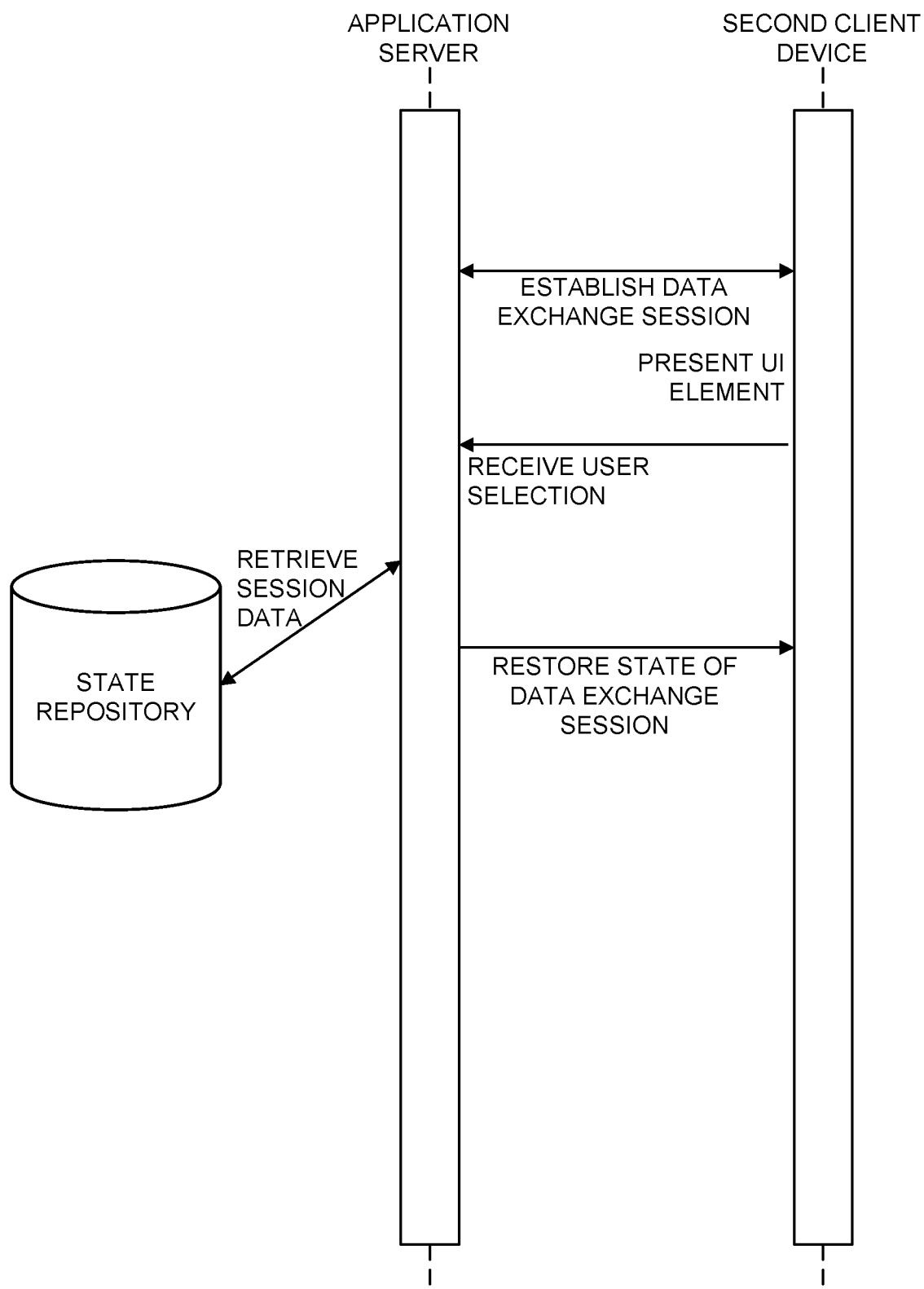
FIG. 4B is an interaction diagram depicting a communication session between a second client device and an application server, consistent with some embodiments.

FIG. 4B is an interaction diagram depicting a communication session between a second client device and an application server, consistent with some embodiments. In particular, the second client device is the second of at least two client devices belonging to the user discussed in FIG. 4A, and may, for example, correspond to client device 106 or 108. Further, the various interactions between the second client device and the application server illustrated in FIG. 4B may be performed subsequent to the storing of session data discussed in FIG. 4A.

As shown in FIG. 4B, a communication session is established between the second client device and the application server. In some embodiments, the user may be instructed to log in or otherwise authenticate his identity as part of establishing the communication session. This authentication may provide the application server with a linking between the first client device and second client device and may provide the user with access to the session data on the second client device, which was saved during the communication session with the first client device. Further, as part of establishing the communication session, the application server may provide the second client device with instructions to present the scratchpad interface discussed in FIG. 4A. Utilizing an I/O device of the second client device, the user may select the visual representation of the session data (discussed in FIG. 4A) displayed in the scratchpad interface. The user selection is then transmitted by the second client device and received by the application server. In response to receiving the user selection, the application server may retrieve the session data from the session data repository (e.g., databases 132) and transmit instructions the second client device which cause the second client device to present the state of the communication session (e.g., originating on the first client device) represented by the session data.

Figure 5A:
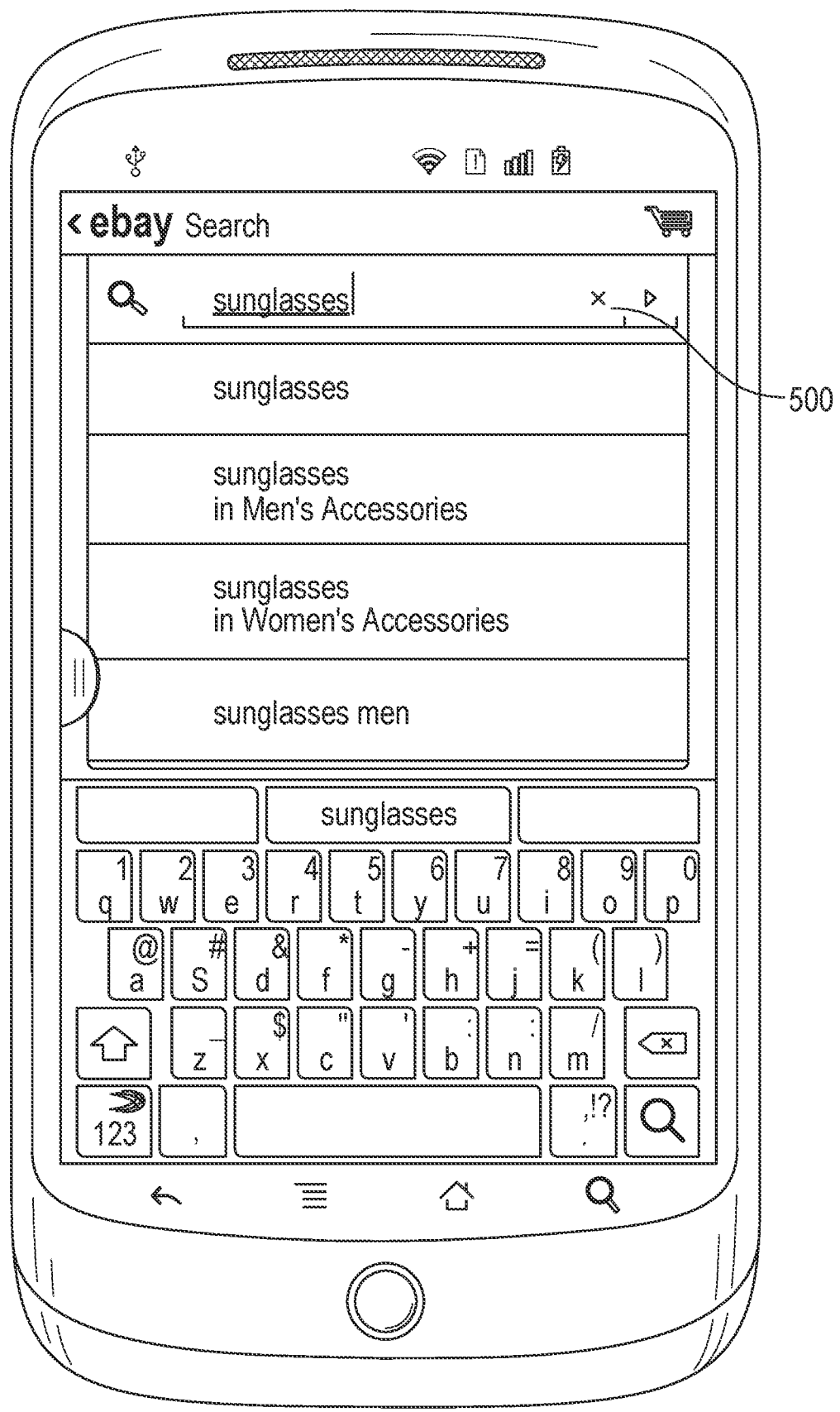
FIG. 5A is an interface diagram depicting a communication session, consistent with some embodiments.

FIG. 5A is an interface diagram depicting an example communication session, consistent with some embodiments. Consistent with some embodiments, the example communication session may take place between the application server 124 and the client device 108 over communication network 104. As illustrated in FIG. 5A, the example communication session includes a search query 500 input by a user on an interface displayed on the client device 108 (e.g., on a touchscreen of the client device 108), which may be transmitted as a request to the application server 124.

Figure 5B:
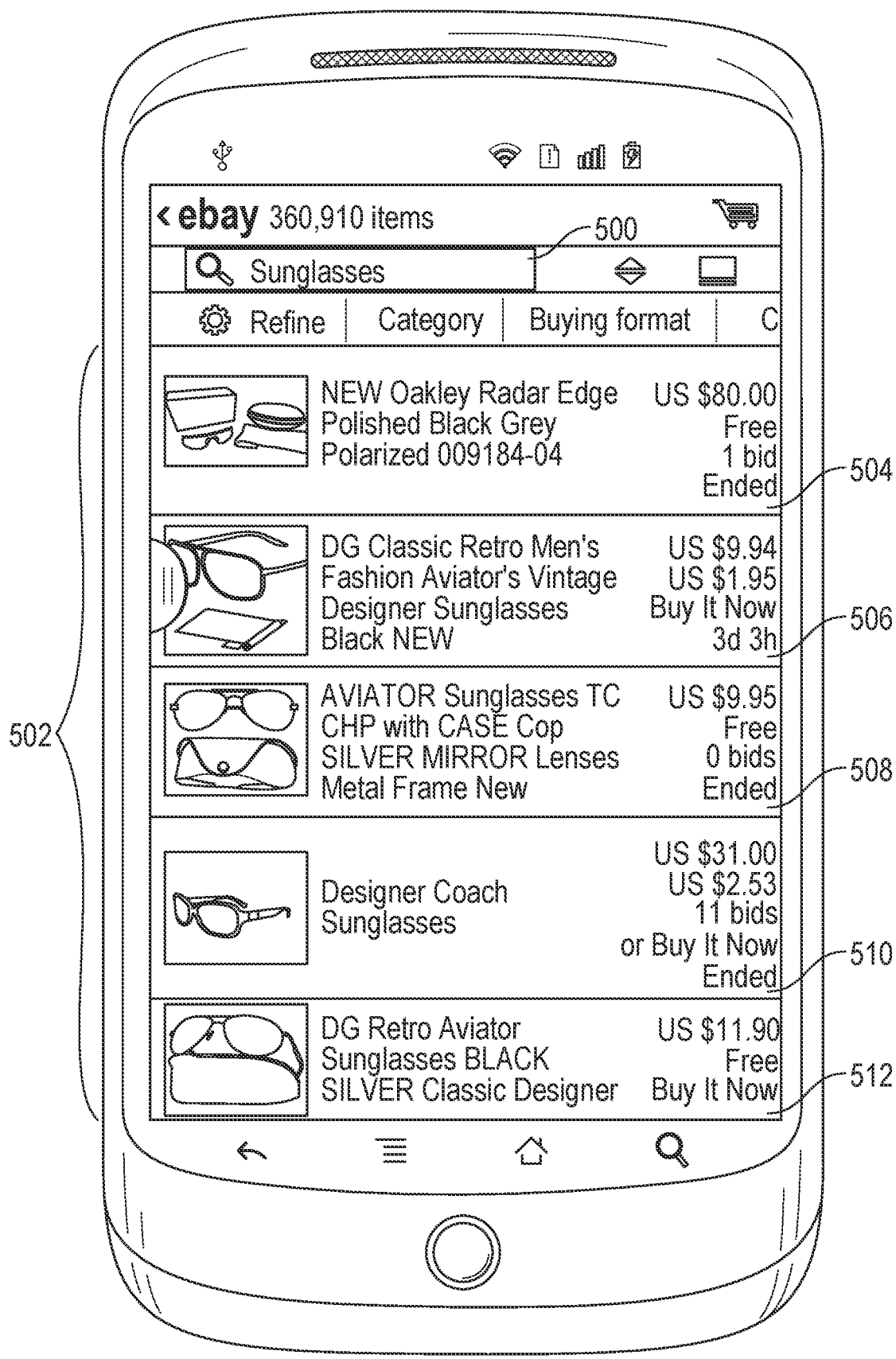
FIG. 5B is an interface diagram depicting a portion of a scratchpad interface displaying session data, consistent with some embodiments.

FIG. 5B is an interface diagram depicting further data exchanges of the communication session, consistent with some embodiments. As illustrated in FIG. 5B, search results 502 may be returned by the application server 124 to the client device 108 in response to receiving the search query 500. In particular, the search results 502 may include items 504-512. As shown, each of the items 504-512 may correspond to a listing for a product offered for sale (e.g., published using the marketplace application 126). Consistent with some embodiments, the user of the client device 108 may, through appropriate touch gesture (e.g., double tap), cause the scratchpad application 128 to capture and store a state of the example communication session.

Figure 5C:
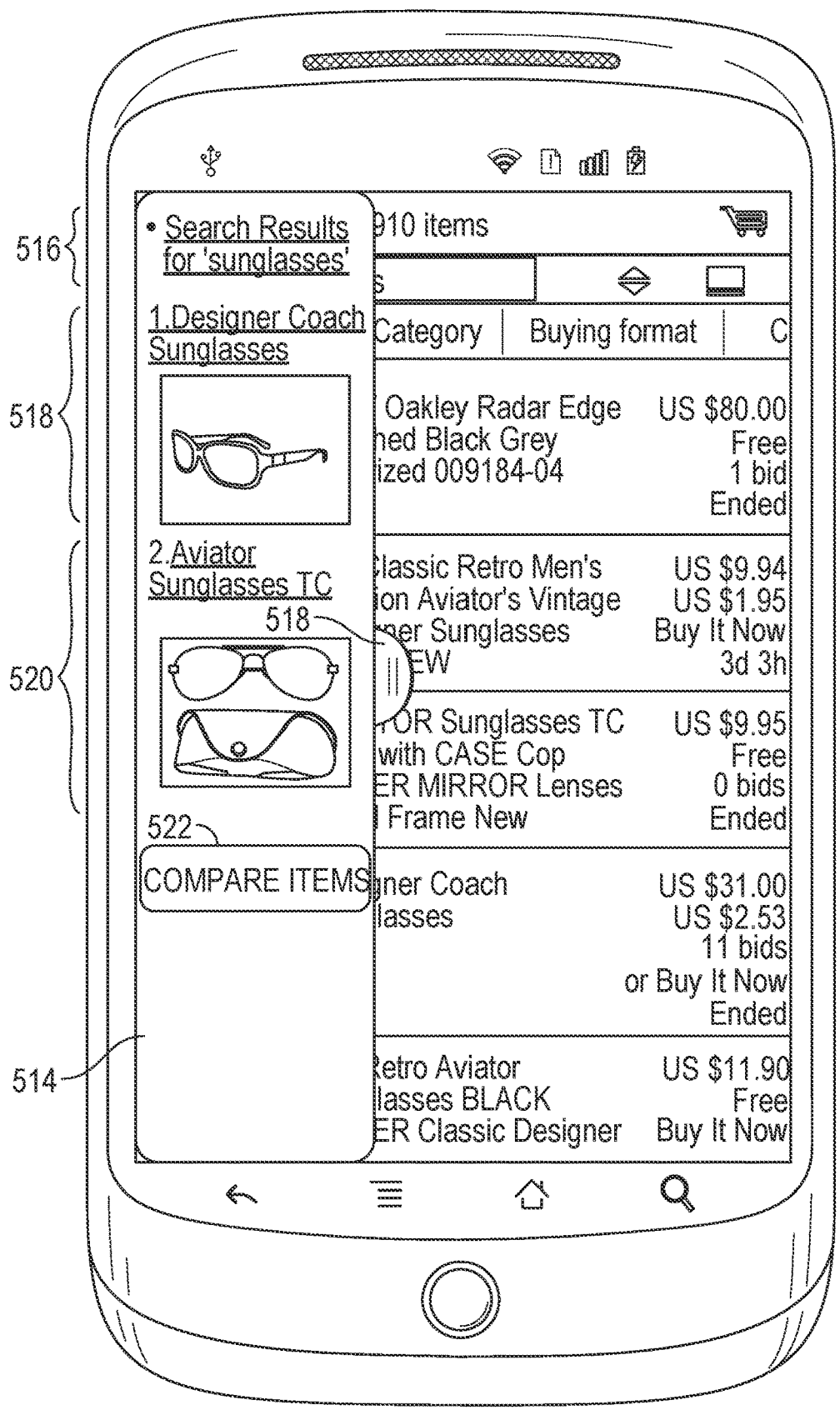
FIG. 5C is an interface diagram depicting a scratchpad interface displaying multiple sets of session data, consistent with some embodiments.

FIG. 5C is an interface diagram depicting a scratchpad interface 514 displaying visual representations of session data, consistent with some embodiments. As illustrated, the scratchpad interface 514 may include an element 516 comprising a hyperlink, which when activated through appropriate user input (e.g., a tap), may cause the client device 108 to return to the display of search results 502 as illustrated in FIG. 5B. The scratchpad interface 514 may also include elements 518 and 520 that each include a hyperlink corresponding to a product listings for items 510 and 508, respectively, viewed during the communication session. As shown, each of the elements 518 and 520 also include additional information (e.g., a description) or content (e.g., a corresponding image) associated with the items 510 and 508. The elements 516-520 are visual representations of session data that has been saved by the scratchpad application 128 in response to receiving applicable user input (e.g., a double tap). In particular, the session data corresponding to element 516 may be saved by the scratchpad application 128 in response to receiving appropriate user input while viewing the search results 502 as illustrated in FIG. 5B. Similarly, the session data corresponding elements 518 and 520 may be saved by the scratchpad application 128 in response to receiving appropriate user input while viewing the listing pages corresponding to items 510 and 508, respectively.

The scratchpad interface 514 may further include tab 518, which may be used to hide or expand the scratchpad interface 514. In some embodiments, the scratchpad interface 514 may be hidden or expanded via a touch gesture swipe to the left or right of the display of the client device 108. The tab 518 may also be used to move the location of the scratchpad interface to the top, bottom or left of the display. The scratchpad interface may also include button 522, which may be used to visually compare items displayed on the scratchpad interface 514.

Figure 5D:
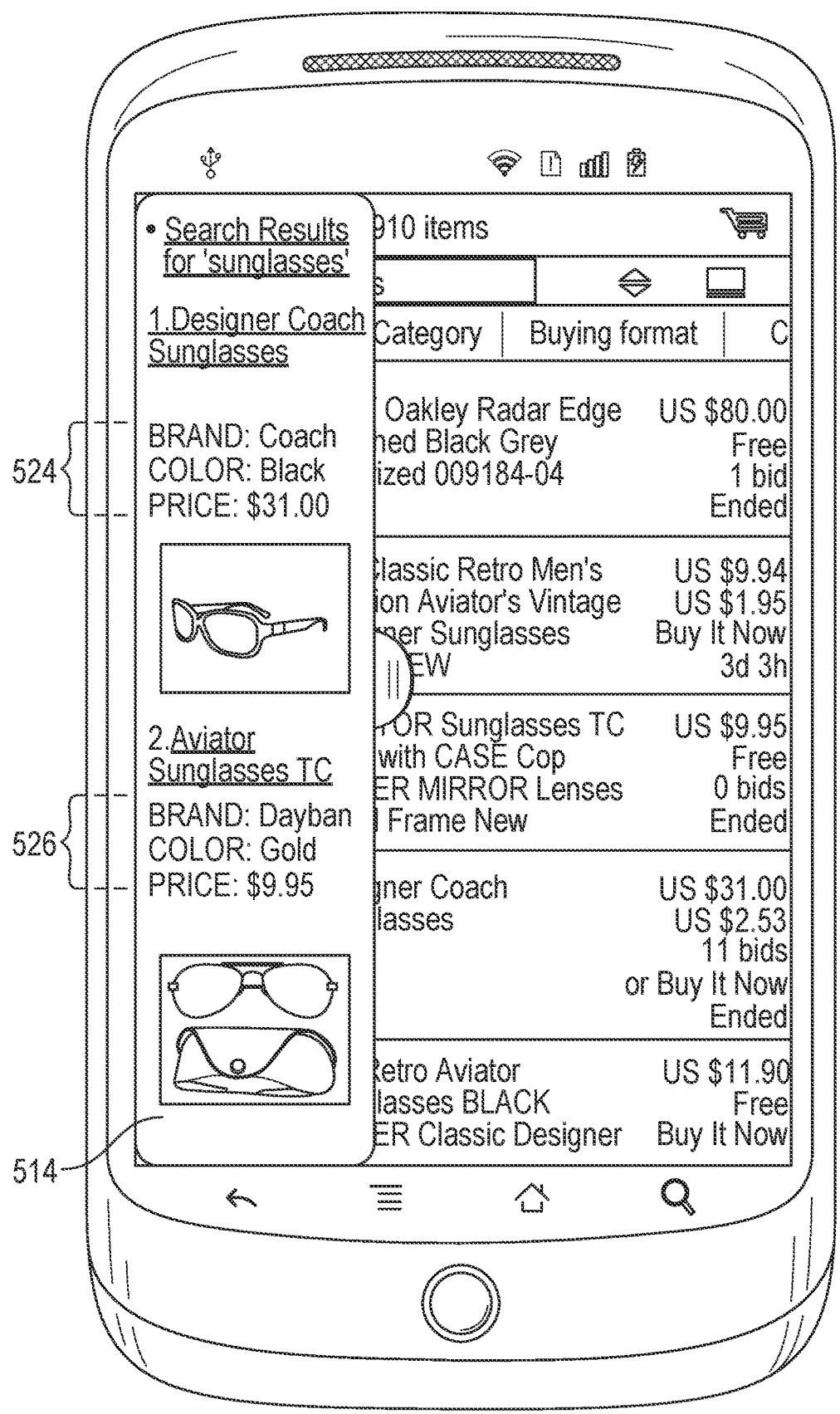
FIG. 5D is an interface diagram depicting restoring a state of a communication session using session data, consistent with some embodiments.

FIG. 5D is an interface diagram depicting a visual comparison of items displayed on the scratchpad interface 514, consistent with some embodiments. Upon selection of the button 522, the scratchpad application 128 may cause the set of attributes 524 and 526 to be displayed on the scratchpad interface 514 presented on the client device 108. While FIG. 5D illustrates the attributes 524 and 526 as including three attributes, it shall be appreciated that in other embodiments, the number of attributes maybe more or fewer. Further, in other embodiments, items other than products offered for sale may be compared, and the displayed attributes may vary according to the item type.

Figure 5E:
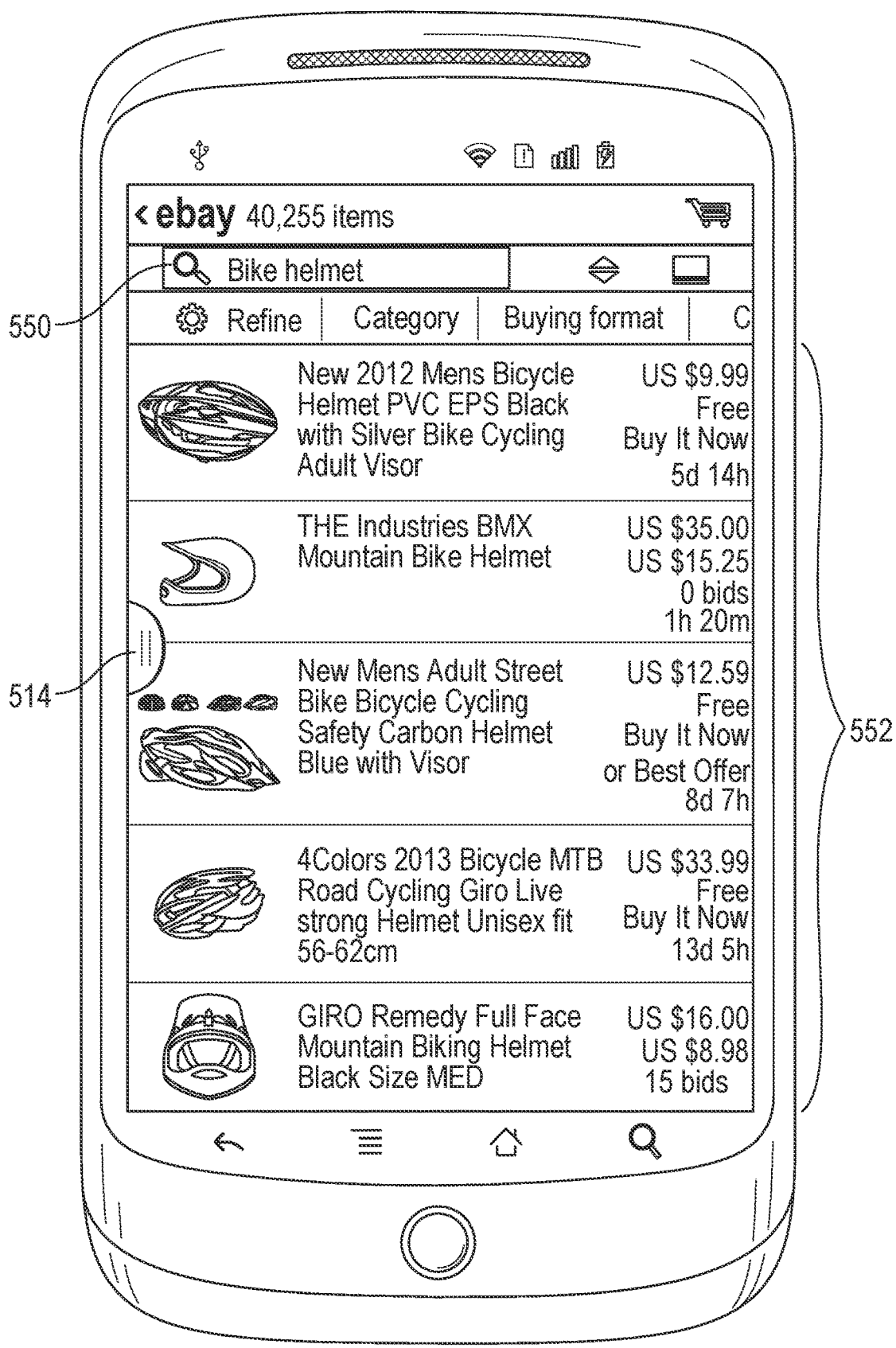
FIG. 5E is an interface diagram depicting further exchanges of the example communication session, consistent with some embodiments.

FIG. 5E is an interface diagram depicting further exchanges of the example communication session, consistent with some embodiments. As illustrated in FIG. 5E, the example exchange session may include a further search query 550 performed subsequent to the search query 500. The search results 552 may be returned by the application server 124 to the client device 108 in response to receiving the search query 550. As shown, the majority of scratchpad interface 514 may be hidden while viewing the search results 552. A small portion of the scratchpad interface 514 (e.g., a tab) may, however, continue to be displayed while viewing the search results 552.

Figure 5F:
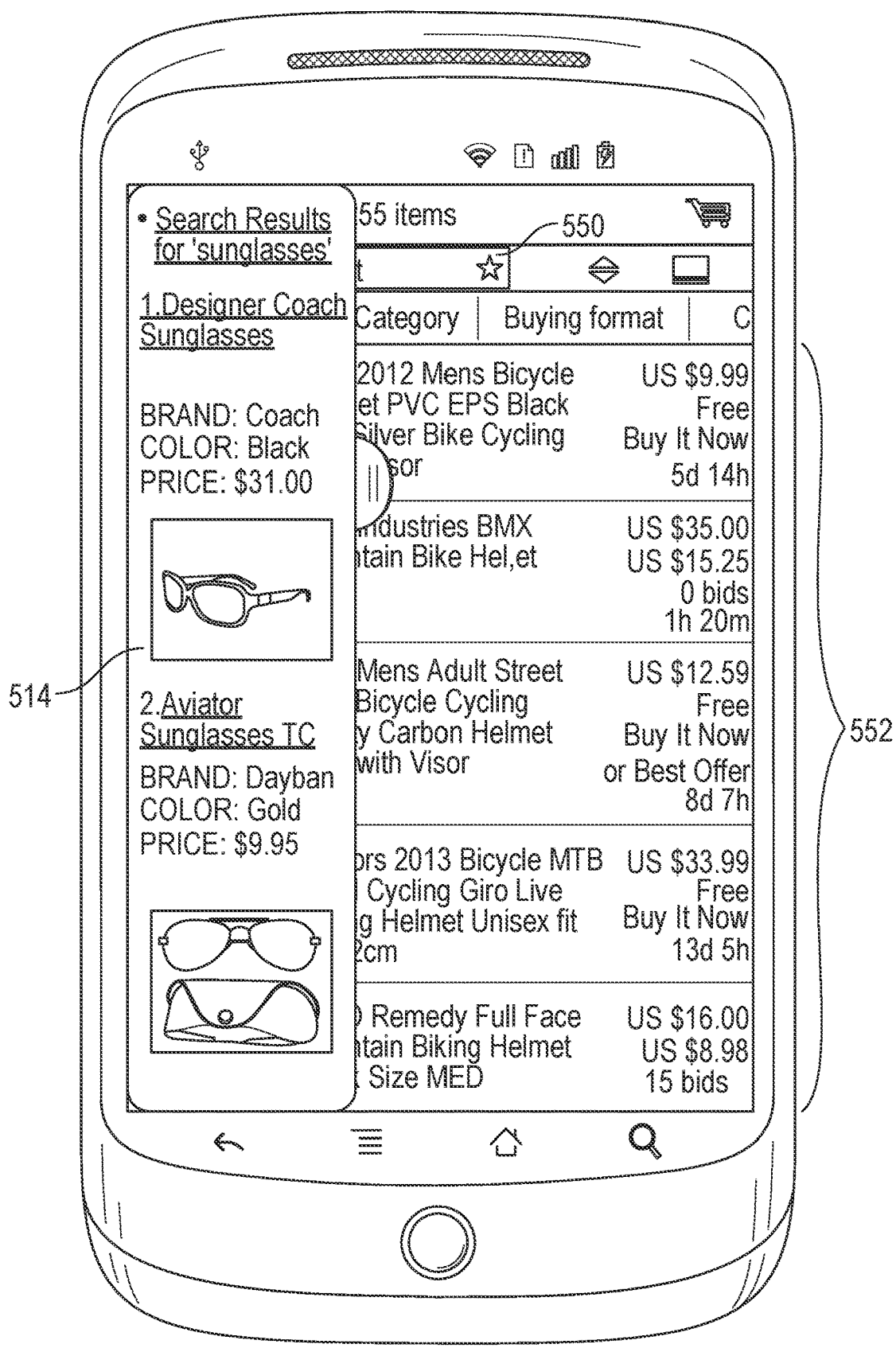
FIG. 5F is an interface diagram depicting a scratchpad interface in conjunction with search results returned in response to a search query as a further exchange of the example communication session, consistent with some embodiments.

FIG. 5F is an interface diagram depicting the scratchpad interface 514 in conjunction with the search results 552 returned in response to the search query 550 as a further exchange of the example communication session, consistent with some embodiments. As shown, the scratchpad interface 514 may be displayed in conjunction with the search results 552 in response to the user dragging (e.g., by touch gesture) the portion of the scratchpad interface 514 across the display of the client device 108. Although the user of the client device 108 may continue to search for other items during the example communication session, the scratchpad interface 514 may continue to include the elements discussed in reference to FIGS. 5C and 5D.

Figure 5G:
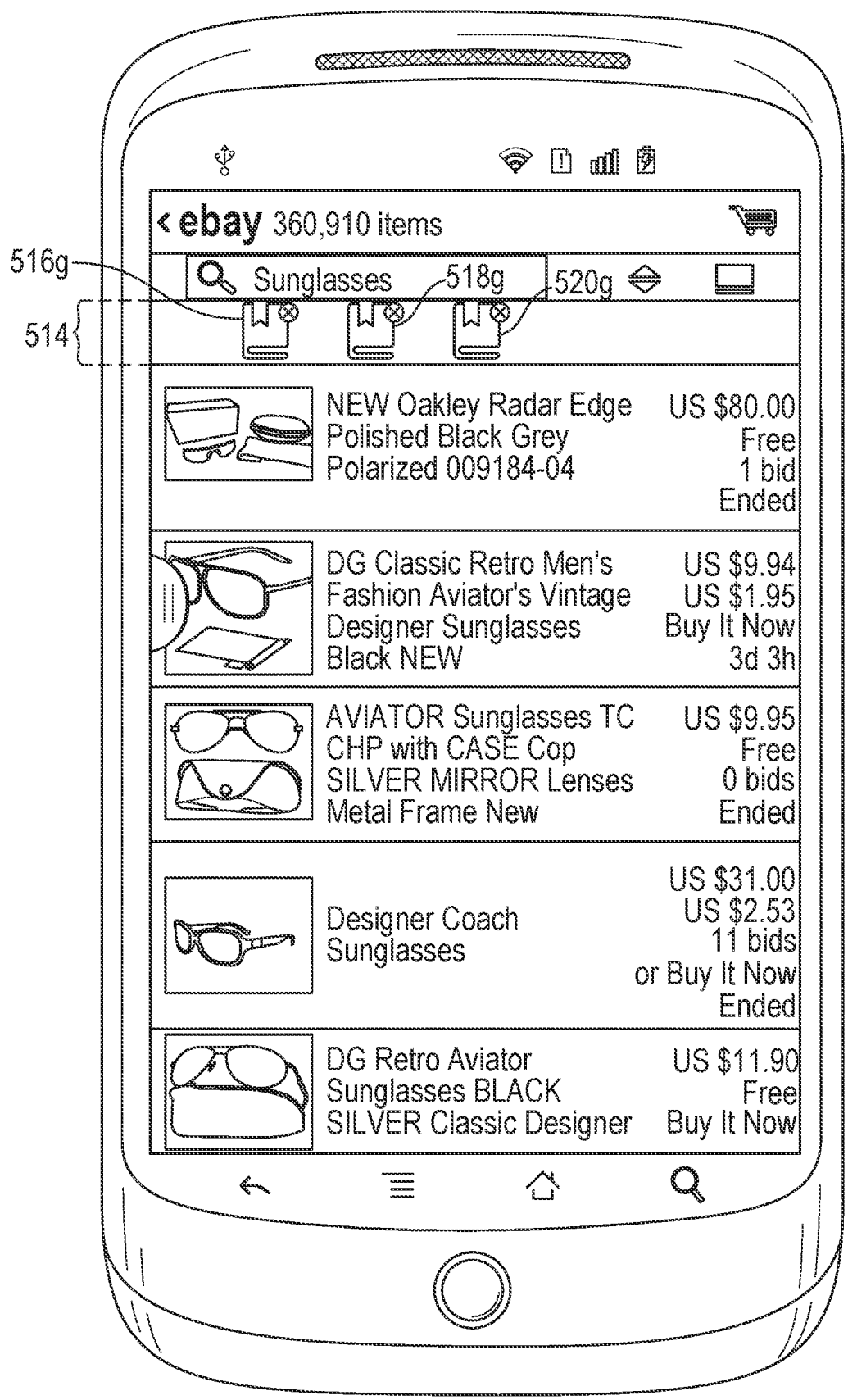
FIG. 5G is an interface diagram depicting the scratchpad interface, consistent with alternative embodiments.

FIG. 5G is an interface diagram depicting the scratchpad interface 514, consistent with some alternative embodiments. As shown, the scratchpad interface 514 may be displayed as a banner overlaid on an unobtrusive portion of the user interface. According to this alternative embodiment, the scratchpad interface 514 may include the elements 516*g*-520*g* which are visual representations (e.g., icons) of session data that has been saved by the scratchpad application 128 in response to receiving applicable user input (e.g., a double tap). Selection of one of the elements 516*g*-520*g* may cause the recall of the corresponding saved state of the communication session.

Figure 5H:
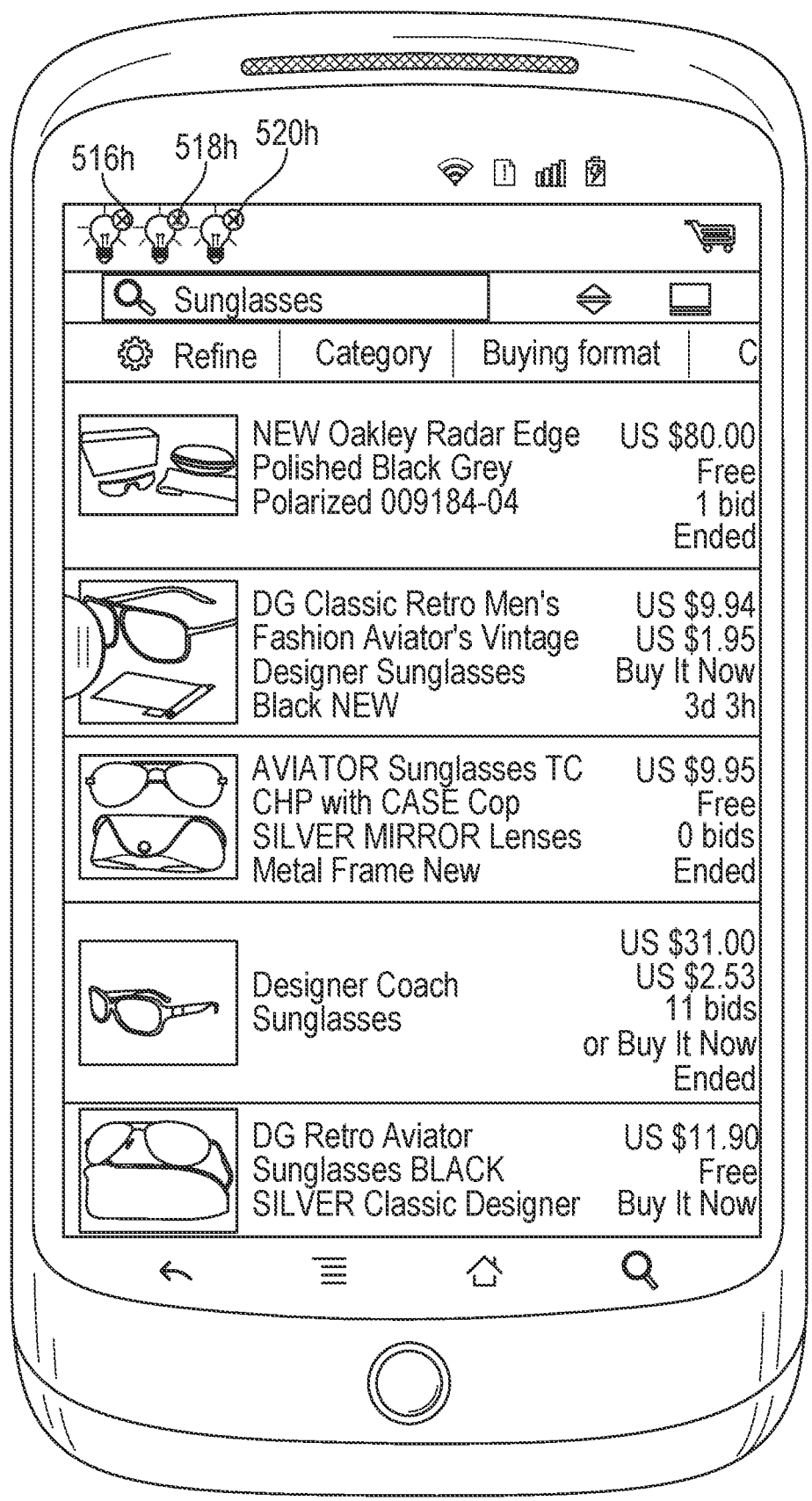
FIG. 5H is an interface diagram depicting a portion of the scratchpad interface, consistent with additional alternative embodiments.

FIG. 5H is an interface diagram depicting the visual representations of saved session data, consistent with additional alternative embodiments. In particular, FIG. 5H illustrates elements 516*h*, 518*h*, and 520*h*, which are visual representations of session data representative of the state of the communication session saved by the scratchpad application 128, consistent with alternative embodiments. As shown, the elements 516*h*, 518*h*, and 520*h* may be displayed independently of the scratchpad interface 514. Further, each of the elements 516*h*, 518*h*, and 520*h* may be moved to any portion of the user interface through user manipulation. Selection of one of the elements 516*h*-520*h* may cause the recall of the corresponding saved state of the communication session.

Figure 6:
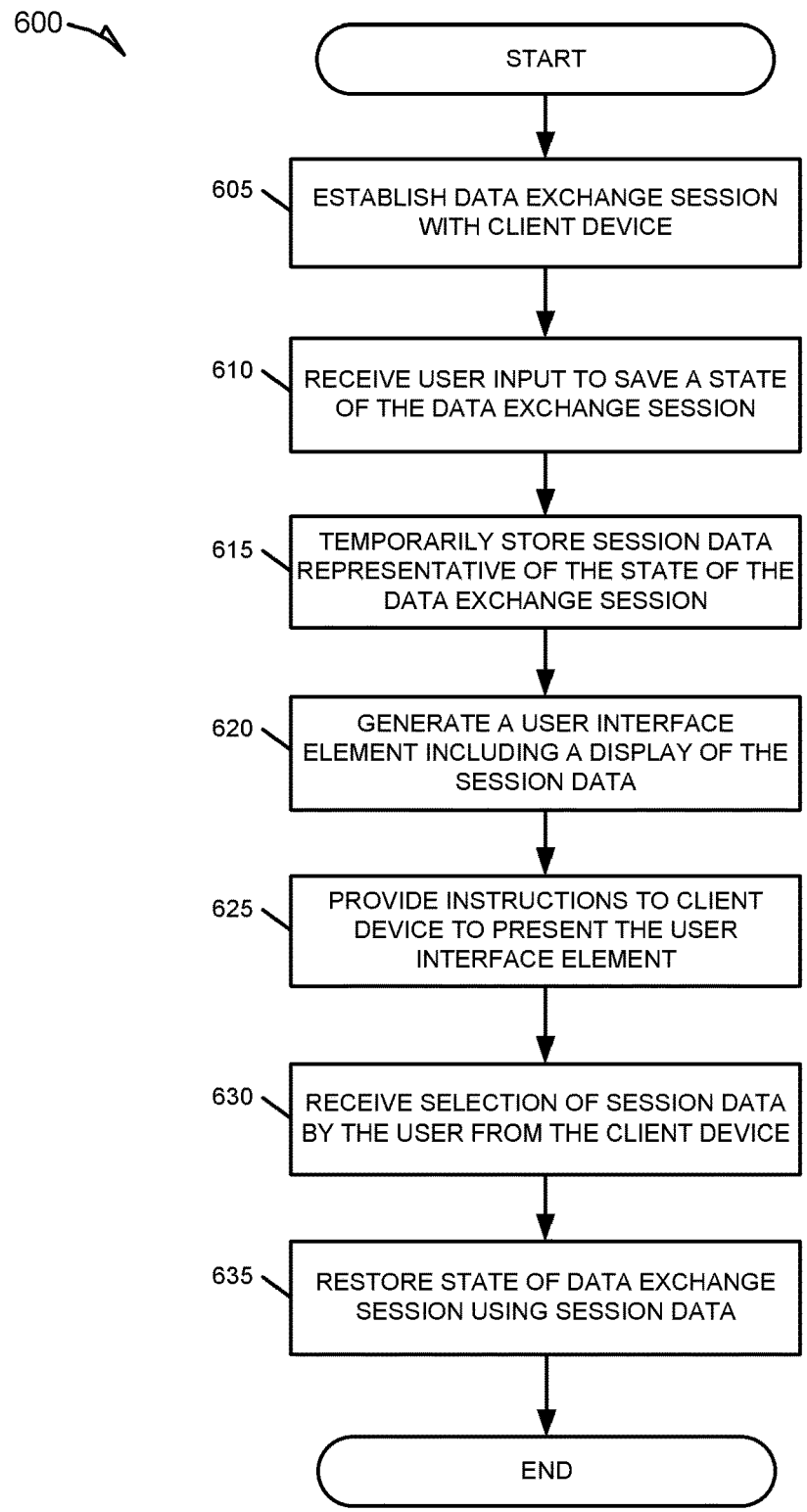
FIG. 6 is a flowchart illustrating an example method of storing and presenting session data, consistent with some embodiments.

FIG. 6 is a flowchart illustrating an example method 600 of storing and presenting session data, consistent with some embodiments. The method 600 may be embodied in computer-readable instructions for execution by one or more processors such that the steps of the method 600 may be performed in part or in whole by the application server 124 or the client devices 106 and 108 and, in particular, the modules 300-304 comprising the scratchpad applications 112 and 128.

At operation 605, a communication session may be established between the client device 106 or 108 and the application server 124. The communication session may include multiple data exchanges including a plurality of requests received from the client device 106 or 108 and a plurality of responses transmitted by the application server 124 in response to the requests. For example, a user of the client device 108 may transmit a keyword search request for products listed for sale using the marketplace application 126. In turn, the application server 124 may respond with a number of search results for products matching the user's keyword search request. At operation 610, the user input module 300 may receive user input from the client device 106 or 108 requesting that a particular state of the communication session be saved for later access. In some embodiments, the user input may be a touch gesture received on a multi-touch sensing surface of the client device 106 or 108. The touch gesture may, for example, be a tap, a double tap, a long press, a pan, a flick, a two finger tap, a pinch open, or the like.

At operation 615, the state module 302 may, in response to the receiving of the user input, cause session data representative of the state of the communication session to be temporarily stored for a predetermined amount of time. The session data may be stored in the database 132, or in some embodiments, in a machine-readable medium of the client device 106 or 108 until an expiration time period has passed. Following the example from above, upon receiving the search results for products matching the user's keyword search request, the user may, for example, double tap the search results displayed on a touchscreen of the client device 108. This user input may then be provided to the user input module 300, and in response the state module 302 may capture and temporarily store the search results as session data in the database 132.

At operation 620, the user interface module 304 may generate a scratchpad interface including a visual representation of the session data. The scratchpad interface may present the session data such that the user may select a particular set of session data, and in turn, the state of the communication session represented by the session data may be restored. The scratchpad interface may further allow a user to compare sets of session data and certain items contained therein. Following the example above, the user interface module 304 may generate a scratchpad interface that includes a textual detail of a selection of the search results. Moreover, because the keyword search query was for products and the search results were products, the scratchpad interface may allow a user to quickly compare the products contained therein.

At operation 625, the user interface module 304 may provide instructions to the client device 106 or 108, which cause the device to present the scratchpad interface. The scratchpad interface may be displayed in conjunction with other content related to the communication session, consistent with some embodiments. Consistent with some embodiments, the visual representation of the session data may include a hyperlink that when activated through user input causes the client device 106 or 108 to return to the state of the communication session represented by the session data. As illustrated in FIG. 6, the method 600 may include optional operations 630 and 635. At operation 630, a selection of session data (e.g., a hyperlink) made by the user may be received by the user input module 300. In response to the user selection (e.g., activating the hyperlink), the state of the communication session represented by the session data may be restored at operation 635. Following the example from above, the scratchpad presented on the client device 108 may include a hyperlink, which when selected by the user, causes the client device 108 to return to the original search query results page.

Figure 7:
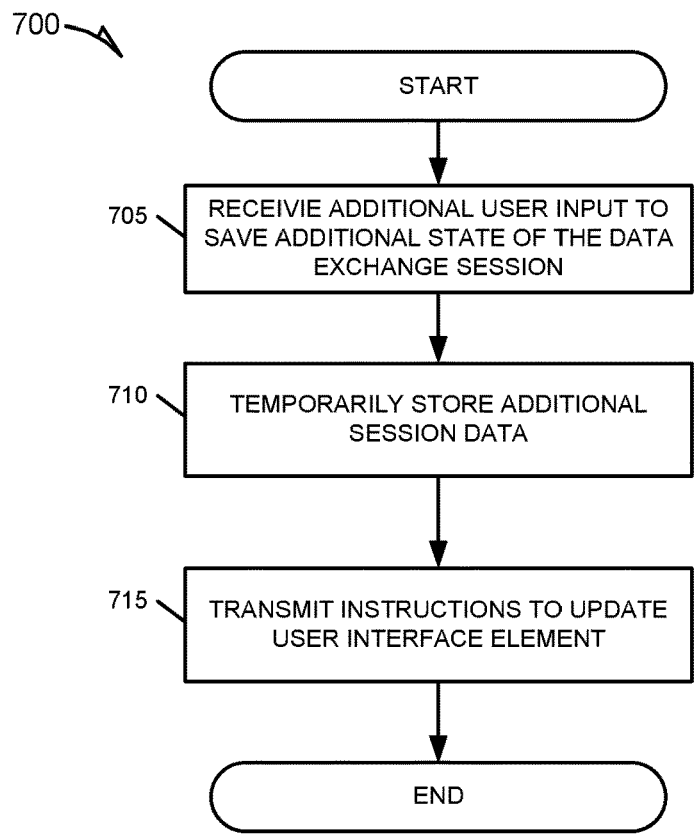
FIG. 7 is a flowchart illustrating an example method for storing additional session data, consistent with some embodiments.

FIG. 7 is a flowchart illustrating an example method for storing additional session data, consistent with some embodiments. The method 700 may be embodied in computer-readable instructions for execution by one or more processors such that the steps of the method 700 may be performed in part or in whole by the application server 124 or the client devices 106 and 108 and, in particular, the modules 300-304 comprising the scratchpad applications 112 and 128. Further, the method 700 may commence subsequent to the completion of method 600, consistent with some embodiments.

At operation 705, the user input module 300 may receive an additional user input to save an additional state of the communication session that is distinct from the session data stored at operation 615 of method 600. The user input may be received in accordance with the methodologies discussed above in reference to method 600. In response to receipt of the user input, the state module 302 may cause additional session data representative of the additional state of the communication session to be temporarily stored at operation 710. The additional session data may be temporarily stored in the database 132, or in some embodiments, in a machine-readable medium of the client device 106 or 108. The additional session data may be stored until an expiration time period has passed. At operation 715, the user interface module 304 may transmit instructions to the client device 106 or 108 that cause the scratchpad interface to be updated to include the additional session data.

Following the example presented in reference to FIG. 6, the user may continue the communication session on the client device 108 with the application server 124 and in doing so perform an additional keyword search for an another product. Upon receiving the search results at the client device 108 from the application server 124, the user may save the additional state of the communication session by again double tapping the search results. In response to the user input, the state module 302 may cause session data representative of the additional search results to be temporarily saved. Further, the scratchpad interface may by updated by the user input module 300 to include the additional search results.

Figure 8:
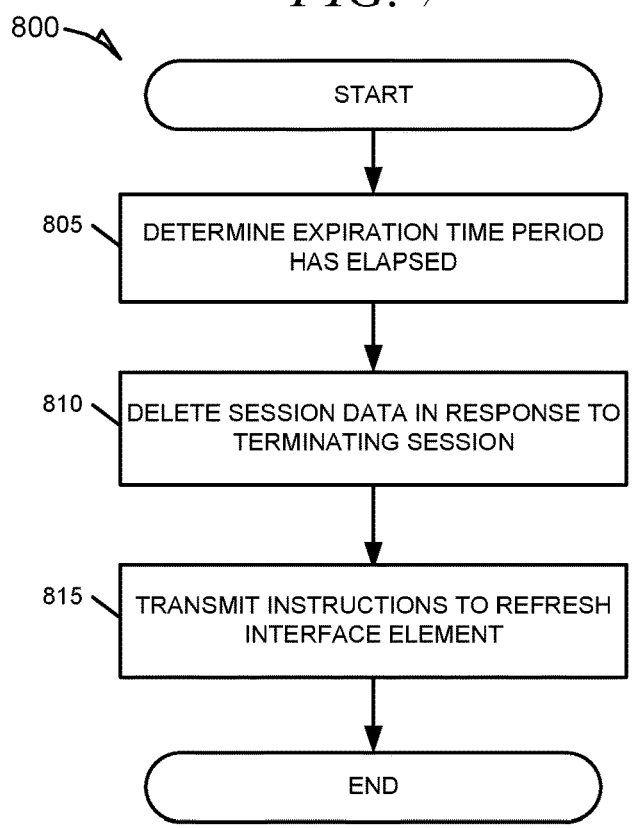
FIG. 8 is a flowchart illustrating an example method for deleting session data, consistent with some embodiments.

FIG. 8 is a flowchart illustrating an example method for deleting session data, consistent with some embodiments. The method 800 may be embodied in computer-readable instructions for execution by one or more processors such that the steps of the method 800 may be performed in part or in whole by the application server 124 or the client devices 106 and 108 and, in particular, the modules 300-304 comprising the scratchpad applications 112 and 128. Further, the method 800 may commence subsequent to the completion of method 600 or 700, consistent with some embodiments.

Consistent with some embodiments, the state module 302 may cause session data to be temporarily stored in the database 132 until an expiration time period has elapsed. At operation 805, the state module 302 may determine that the expiration time period has elapsed. Consistent with some embodiments, the expiration time period may be the duration of the communication session, and in such embodiments, the operation 805 comprises determining that the communication session has terminated. In some embodiments, the expiration time period may be a default value or a value set by a user.

At operation 810, the state module 302 may cause the stored session data to be deleted in response to determining that the expiration time period has elapsed. In some embodiments, if the client device 106 or 108 is still engaged in a communication session, the user interface module 304 may, at operation 815, transmit instructions to the client device 106 or 108 that cause the device to refresh the scratchpad interface. Upon being refreshed, the scratchpad interface will no longer include visual representations of the session data for which the expiration time period has elapsed, and in turn, the user may no longer return to the state of the communication session represented by the expired session data.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a FPGA or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
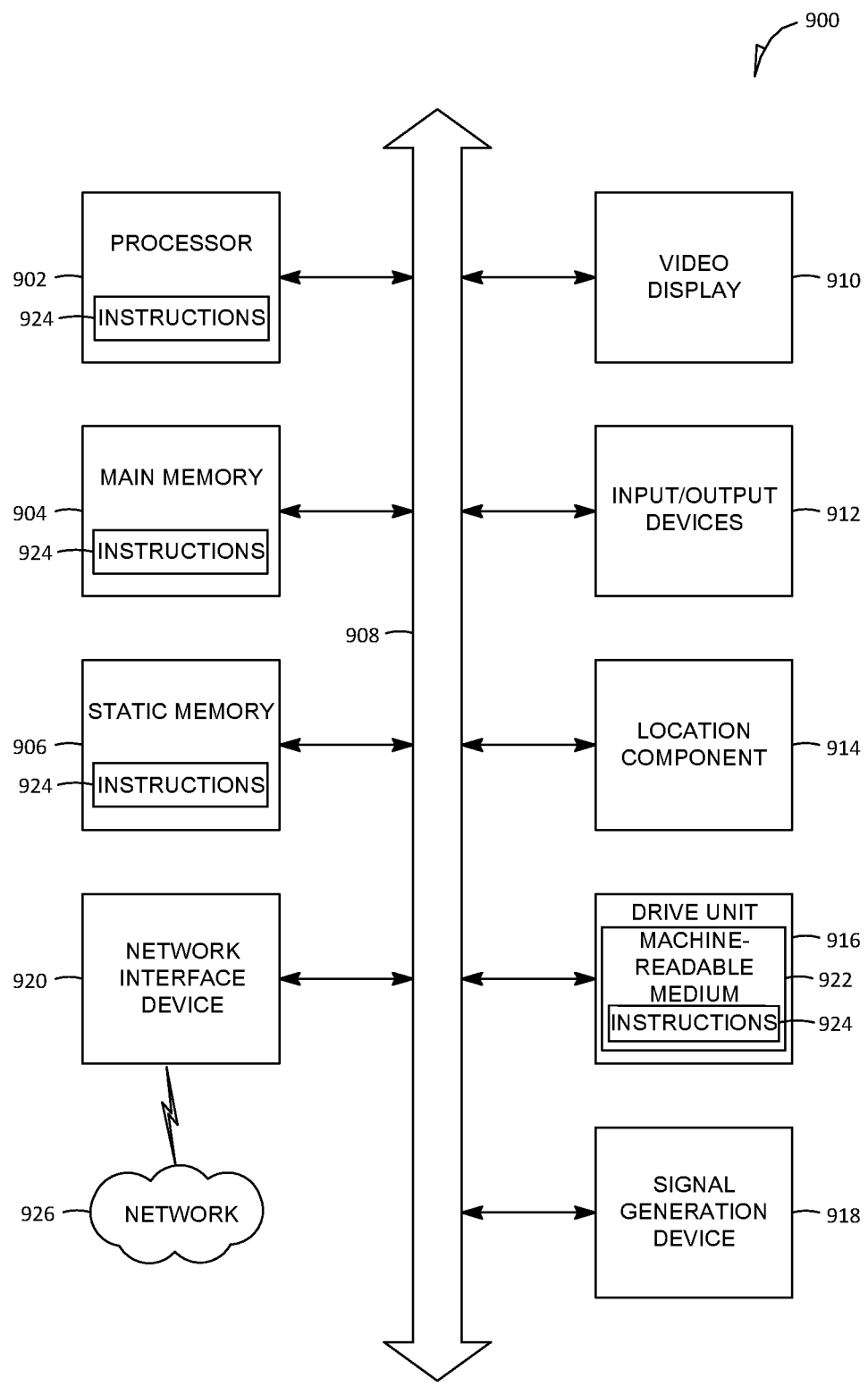
FIG. 9 is a diagrammatic representation of a machine in the example form of a computer system within which a set of instructions for causing the machine to perform any one or more of the methodologies discussed herein may be executed.

FIG. 9 is a diagrammatic representation of a machine in the example form of a computer system 900 within which a set of instructions 924 for causing the machine to perform any one or more of the methodologies discussed herein may be executed. The computer system 900 may correspond to client device 106, third party server 114, or application server 124, consistent with some embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a smart phone (e.g., iPhone®), a tablet computer, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes one or more input/output (I/O) devices 912, a location component 914, a disk drive unit 916, a signal generation device 918 (e.g., a speaker), and a network interface device 920. The I/O devices 912 may, for example, include a keyboard, a mouse, a keypad, a multi-touch surface (e.g., a touchscreen or track pad), a microphone, a camera, and the like.

The location component 914 may be used for determining a location of the computer system 900. In some embodiments, the location component 914 may correspond to a GPS transceiver that may make use of the network interface device 920 to communicate GPS signals with a GPS satellite. The location component 914 may also be configured to determine a location of the computer system 900 by using an internet protocol (IP) address lookup or by triangulating a position based on nearby mobile communications towers. The location component 914 may be further configured to store a user-defined location in main memory 904 or static memory 906. In some embodiments, a mobile location enabled application may work in conjunction with the location component 914 and the network interface device 920 to transmit the location of the computer system 900 to an application server or third party server for the purpose of identifying the location of a user operating the computer system 900.

In some embodiments, the network interface device 920 may correspond to a transceiver and antenna. The transceiver may be configured to both transmit and receive cellular network signals, wireless data signals, or other types of signals via the antenna, depending on the nature of the computer system 900.

Machine-Readable Medium

The disk drive unit 916 includes a machine-readable medium 922 on which is stored one or more sets of data structures and instructions 924 (e.g., software) embodying or used by any one or more of the methodologies or functions described herein. The instructions 924 may also reside, completely or at least partially, within the main memory 904, static memory 906, and/or within the processor 902 during execution thereof by the computer system 900, with the main memory 904 and the processor 902 also constituting machine-readable media.

Consistent with some embodiments, the instructions 924 may relate to the operations of an operating system (OS). Further, the instructions 924 may relate to operations performed by applications (commonly known as "apps"), consistent with some embodiments. One example of such an application is a mobile browser application that displays content, such as a web page or a user interface using a browser.

While the machine-readable medium 922 is shown in an example embodiment to be a single medium, the term "machine-readable medium" may include a single medium or multiple media (e.g., a centralized or distributed database, and/or associated caches and servers) that store the one or more data structures or instructions 924. The term "machine-readable medium" shall also be taken to include any tangible medium that is capable of storing, encoding, or carrying instructions (e.g., instructions 924) for execution by the machine and that cause the machine to perform any one or more of the methodologies of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., erasable programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," and so forth are used merely as labels, and are not intended to impose numerical requirements on their objects.

The invention claimed is:

1. A method comprising:
   in response to a search query, causing display of search results, the search results including a listing of multiple items offered for sale in an online marketplace, and a first item and a second item included in the listing of multiple items;
   receiving a first user input on a first web page of the first item, the first user input received subsequent to the display of the search results;
   in response to the first user input, displaying a user interface that includes a first visual representation of the first item including a first description of the first item, the user interface partially overlaying the search results;
   receiving a second user input on a second web page of the second item;
   in response to the second user input, causing display of a second visual representation of the second item including a second description of the second item in the user interface, the first visual representation including the first description of the first item selectable to cause navigation back to the first web page of the first item, and the second visual representation including the second description of the second item selectable to cause navigation back to the second web page of the second item; and
   causing display of a compare control in the user interface, the compare control selectable to generate a visual comparison of the first item and the second item.

2. The method of claim 1, further comprising:
   receiving a user selection of the compare control; and
   responsive to the user selection of the compare control, causing display of the visual comparison of the first item and the second item, the visual comparison including a display of at least a first set of attributes corresponding to the first item and a second set of attributes corresponding to the second item.

3. The method of claim 2, wherein the visual comparison of the first set of attributes and the second set of attributes includes at least a visual comparison of a brand and a price of the first item and the second item.

4. The method of claim 1, wherein the user interface comprises a banner.

5. The method of claim 1, further comprising:
   in response to the first user input, saving a first context of a communication session, the first context associated with the first web page of the first item; and
   in response to the second user input, saving a second context of the communication session, the second context associated with the second web page of the second item.

6. The method of claim 1, wherein the first item and the second item are part of a group of items.

7. The method of claim 6, wherein items of the group of items are from a particular category of items.

8. The method of claim 6, wherein items in the group of items are items from a plurality of categories of items.

9. The method of claim 6, further comprising:
   receiving user input indicating a request to compare the group of items; and
   causing display of a visual comparison of the group of items, the visual comparison including a display of a select set of attributes corresponding to items of the group of items.

10. One or more non-transitory machine-readable storage media storing instructions that, responsive to execution by a processor, cause the processor to perform operations comprising:
    in response to a search query, causing display of search results, the search results including a listing of multiple items offered for sale in an online marketplace, and a first item and a second item included in the listing of multiple items;
    receiving a first user input on a first web page of the first item, the first user input received subsequent to the display of the search results;
    in response to the first user input, displaying a user interface that includes a first visual representation of the first item including a first description of the first item, the user interface partially overlaying the search results;
    receiving a second user input on a second web page of the second item;
    in response to the second user input, causing display of a second visual representation of the second item including a second description of the second item in the user interface, the first visual representation including the first description of the first item selectable to cause navigation back to the first web page of the first item, and the second visual representation including the second description of the second item selectable to cause navigation back to the second web page of the second item; and
    causing display of a compare control in the user interface, the compare control selectable to generate a visual comparison of the first item and the second item.

11. The one or more non-transitory machine-readable storage media of claim 10, wherein the operations further comprise:
receiving a user selection of the compare control; and
responsive to the user selection of the compare control, causing display of the visual comparison of the first item and the second item, the visual comparison including a display of at least a first set of attributes corresponding to the first item and a second set of attributes corresponding to the second item.

12. The one or more non-transitory machine-readable storage media of claim 11, wherein the visual comparison of the first set of attributes and the second set of attributes includes at least a visual comparison of a brand and a price of the first item and the second item.

13. The one or more non-transitory machine-readable storage media of claim 10, wherein the user interface comprises a banner.

14. A computing device comprising:
a display device; and
at least a memory and a processor to perform operations comprising:
in response to a search query, causing display of search results via the display device, the search results including a listing of multiple items offered for sale in an online marketplace, and a first item and a second item included in the listing of multiple items;
receiving a first user input on a first web page of the first item the first user input received subsequent to the display of the search results;
in response to the first user input, displaying a user interface that includes a first visual representation of the first item including a first description of the first item on the display device, the user interface partially overlaying the search results;
receiving a second user input on a second web page of the second item;
in response to the second user input, causing display of a second visual representation of the second item including a second description of the second item in the user interface, the first visual representation including the first description of the first item selectable to cause navigation back to the first web page of the first item, and the second visual representation including the second description of the second item selectable to cause navigation back to the second web page of the second item; and
causing display of a compare control in the user interface, the compare control selectable to generate a visual comparison of the first item and the second item.

15. The computing device of claim 14, wherein the operations further comprise:
in response to the first user input, saving a first context of a communication session, the first context associated with the first web page of the first item; and
in response to the second user input, saving a second context of the communication session, the second context associated with the second web page of the second item.

16. The computing device of claim 14, wherein the operations further comprise:
receiving a user selection of the compare control; and
responsive to the user selection of the compare control, causing display of the visual comparison of the first item and the second item.

17. The computing device of claim 16, wherein the visual comparison includes a display of a first set of attributes corresponding to the first item and a second set of attributes corresponding to the second item.

18. The computing device of claim 17, wherein the first set of attributes includes a brand and a price of the first item and the second set of attributes includes the brand and the price of the second item.

19. The computing device of claim 14, wherein the user interface comprises a banner.

20. The computing device of claim 14, wherein the user interface is displayed at a bottom display location on the display device.

\* \* \* \* \*